United States Patent

Kawakami et al.

[11] Patent Number: 5,608,894
[45] Date of Patent: Mar. 4, 1997

[54] EXECUTION CONTROL SYSTEM

[75] Inventors: Kumiko Kawakami; Yasuko Akagawa; Masumi Takahashi, all of Kawasaki, Japan

[73] Assignee: Fujitsu Limited, Kawasaki, Japan

[21] Appl. No.: 325,056

[22] Filed: Oct. 19, 1994

[30] Foreign Application Priority Data

Mar. 18, 1994 [JP] Japan .................................. 6-049504

[51] Int. Cl.$^6$ ...................................................... G06F 7/10
[52] U.S. Cl. .................................. 395/500; 364/DIG. 1; 364/226.4; 364/260.4; 364/260.9; 364/284
[58] Field of Search ........................ 395/500, 600, 395/700, 325, 153; 364/200, DIG. 1 MS File, DIG. 2 MS File

[56] References Cited

U.S. PATENT DOCUMENTS

| | | | |
|---|---|---|---|
| 5,045,994 | 9/1991 | Belfer et al. | 364/200 |
| 5,097,533 | 3/1992 | Burger et al. | 395/500 |
| 5,155,837 | 10/1992 | Liu et al. | 395/500 |
| 5,251,314 | 10/1993 | Williams | 395/600 |
| 5,280,610 | 1/1994 | Travis, Jr. et al. | 395/600 |
| 5,283,900 | 2/1994 | Frankel et al. | 395/700 |
| 5,379,383 | 1/1995 | Yunoki | 395/325 |
| 5,386,558 | 1/1995 | Maudlin et al. | 395/600 |
| 5,388,196 | 2/1995 | Pajak et al. | 395/153 |
| 5,452,433 | 9/1995 | Nihart et al. | 395/500 |

FOREIGN PATENT DOCUMENTS

| | | |
|---|---|---|
| 0261690 | 3/1988 | European Pat. Off. . |
| 0496494 | 7/1992 | European Pat. Off. . |
| 3-191429 | 8/1991 | Japan . |

*Primary Examiner*—Kevin J. Teska
*Assistant Examiner*—Russell W. Frejd
*Attorney, Agent, or Firm*—Staas & Halsey

[57] ABSTRACT

An execution control system includes: shared reference information including procedure information to be referred to by software components when an execution request information is issued by a software component; and control means which refers to the shared reference information on the basis of the execution request information issued by the software component, combines software components, and controls the execution of the software components.

32 Claims, 23 Drawing Sheets

F I G . 5
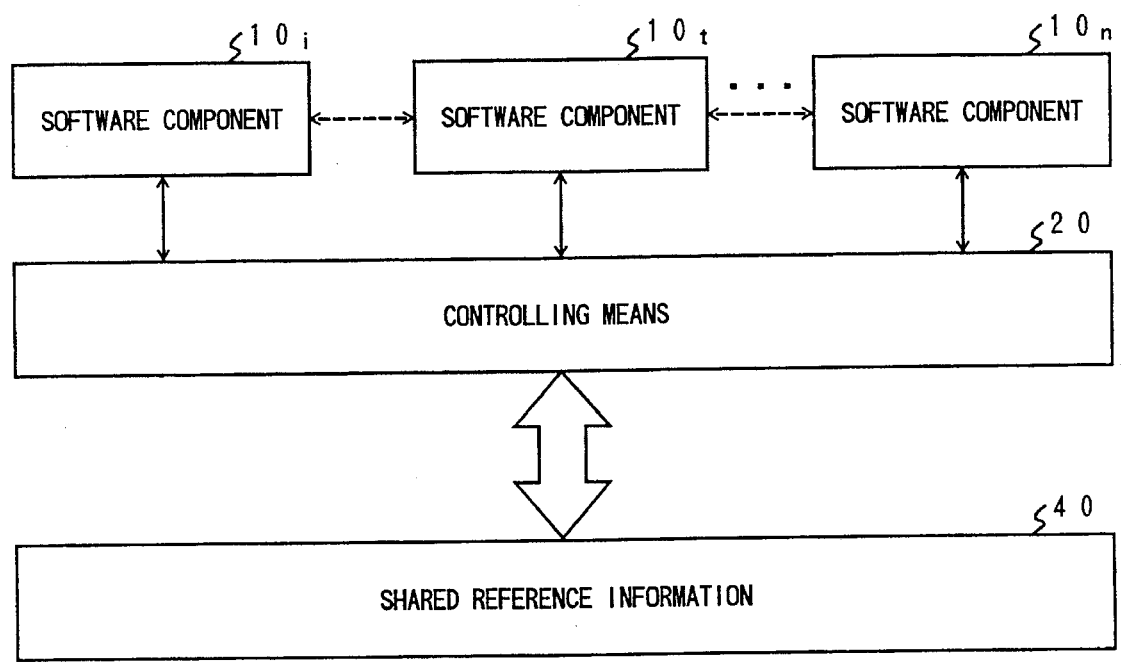

FIG. 9

<COMBINATION INFORMATION OF APPARATUS X>　400

DEFINITION OF SOFTWARE COMPONENT

| | USAGE #1 |
|---|---|
| COMPONENT a | |
| COMPONENT b | |

DEFINITION OF PROCESS

| | COMPONENT | ATTRIBUTE #2 |
|---|---|---|
| PROCESS 1 | a, b | |
| PROCESS 2 | c | |

INFORMATION RELATING TO TARGET COMPONENT TO BE COMBINED (PROCESS SEQUENCE)

| REQUEST TYPE | DESTINATION |
|---|---|
| REQUEST FROM a | APPARATUS X, PROCESS 1. b |
| REQUEST FROM a | APPARATUS X, PROCESS 2. c |
| REQUEST FROM a | APPARATUS Y, PROCESS 1. e |

FIG. 14

| | | | | | |
|---|---|---|---|---|---|
| DEFINITION BODY | | | | | |
| | APPLICATION COUNT | | | | 3001 |
| APPLICATION INFORMATION | APPLICATION ID No. | | | | 3003 |
| | APPLICATION MONITOR TIME | | | | 3004 |
| | APPLICATION START MESSAGE INFORMATION | WAIT TIME | | | 3006 |
| | | EXCLUDED TYPE | | | 3007 |
| | | RECEIVED MESSAGE INFORMATION | RECEIVED MESSAGE COUNT | | 3009 |
| | | | RECEIVED MESSAGE DETAILED INFORMATION | RECEIVED MESSAGE CODE | 3011 |
| | | | | MESSAGE DETERMINATION INFORMATION | 3012 |
| | | SENT MESSAGE INFORMATION | SENT MESSAGE COUNT | | 3014 |
| | | | SENT MESSAGE DETAILED INFORMATION | DESTINATION INFORMATION | 3016 |
| | | | | NORMALCY INFORMATION | MESSAGE CODE — 3019 |
| | | | | | INTERFACE EDITING INFORMATION — 3020 |
| | | | | ABNORMALITY INFORMATION | MESSAGE CODE — 3021 |
| | | | | | INTERFACE EDITING INFORMATION |
| | APPLICATION END MESSAGE INFORMATION | WAIT TIME | | | 3023 |
| | | EXCLUDED TYPE | | | |
| | | RECEIVED MESSAGE INFORMATION | RECEIVED MESSAGE COUNT | | |
| | | | RECEIVED MESSAGE DETAILED INFORMATION | RECEIVED MESSAGE CODE | 3022 |
| | | | | MESSAGE DETERMINATION INFORMATION | 3024 |
| | | SENT MESSAGE INFORMATION | SENT MESSAGE COUNT | | 3025 |
| | | | SENT MESSAGE DETAILED INFORMATION | DESTINATION INFORMATION | 3027 |
| | | | | NORMALCY INFORMATION | MESSAGE CODE — 3028 |
| | | | | | INTERFACE EDITING INFORMATION — 3029 |
| | | | | ABNORMALITY INFORMATION | MESSAGE CODE |
| | | | | | INTERFACE EDITING INFORMATION |
| | MESSAGE INFORMATION | WAIT TIME | | | 3031 |
| | | EXCLUDED TYPE | | | |
| | | RECEIVED MESSAGE INFORMATION | RECEIVED MESSAGE COUNT | | 3030 |
| | | | RECEIVED MESSAGE DETAILED INFORMATION | RECEIVED MESSAGE CODE | |
| | | | | MESSAGE DETERMINATION INFORMATION | 3032 |
| | | SENT MESSAGE INFORMATION | SENT MESSAGE COUNT | | 3033 |
| | | | SENT MESSAGE DETAILED INFORMATION | DESTINATION INFORMATION | 3035 |
| | | | | NORMALCY INFORMATION | MESSAGE CODE — 3036 |
| | | | | | INTERFACE EDITING INFORMATION — 3037 |
| | | | | ABNORMALITY INFORMATION | MESSAGE CODE |
| | | | | | INTERFACE EDITING INFORMATION |

Reference labels: 3002, 3005, 3008, 3010, 3013, 3015, 3017, 3018, 3026, 3034, 3040, 3041

| APPLICATION No. | APPLICATION SEQUENCE | VALID/INVALID |
|---|---|---|
| ① | PROCESS a → PROCESS b | . |
| ② | PROCESS b → PROCESS c | . |
| ③ | PROCESS c → PROCESS d | . |
| ④ | PROCESS b → PROCESS f | . |
| ⑤ | PROCESS g → PROCESS f | . |
| ⑥ | PROCESS h → PROCESS a | . |
| ⑦ | PROCESS a → PROCESS i | . |
| ⋮ | ⋮ | ⋮ |

| APPLICATION No. | APPLICATION SEQUENCE | VALID/INVALID |
|---|---|---|
| ① | PROCESS a → PROCESS b | VALID |
| ② | PROCESS b → PROCESS c | VALID |
| ③ | PROCESS c → PROCESS d | VALID |
| ④ | PROCESS b → PROCESS f | INVALID |
| ⑤ | PROCESS g → PROCESS f | INVALID |
| ⑥ | PROCESS h → PROCESS a | INVALID |
| ⑦ | PROCESS a → PROCESS i | INVALID |
| ⋮ | ⋮ | ⋮ |

EXECUTION CONTROL SYSTEM

BACKGROUND OF THE INVENTION

The present invention relates to an execution control system applied to software components and employed in the development of software for a computer system handling real-time information, the execution control system including: a method of combining software components which method is adapted to processing requirements and allows software pieces created in accordance with a predetermined standard to be combined; message exchanging between software components; and an operation mode control method for switching operation modes when the software components are executed in a redundant system.

Recently, there has been a demand that the following processes be simplified when a plurality of individually developed software components are combined for a real-time-process: the setting of a condition for combining individual software units; and a process for software update process.

In every software component, whether it is called within a process or from a library, a process is started when a request for a process is generated, and the process is terminated when the requested function is realized. A description will be given below of a conventional method of exchanging messages between software components in response to a request for a process.

FIG. 1 shows a first example of conventional technology. Referring to FIG. 1, an apparatus 11 accommodates two processes 1 and 2, wherein the process 1 includes a software component a and a software component b, and the process 2 includes a software component c. An apparatus 13 accommodates one process 3 which includes a software component d. The software component refers to an application program which performs an arbitrary process.

When a plurality of software components are combined in the conventional system, information relating to the combination such as the method of combining, the target software component to be combined and the like is created within the software (program).

As shown in FIG. 1, the software component a contains a logic for transferring an external message to the software component b. The software component b contains a logic whereby the message received from the software component a is transferred to the software component c of the process 2. Instead of being passed from the software component b to the software component c, the message may be passed via a logic for activating the process 2 or via a table/file. The writing of the information from the software component c of the process 2 to the software component d of the process 1 of the apparatus 13 is effected via a socket. The software component d contains a logic for reading the information from the software component c. Instead of being written via the socket, the information may be written from the apparatus 11 to the apparatus 13 by specifying a pertinent interface.

As shown in FIG. 1, the software components a, b, c and d contain combination information (execution request information) for requesting the execution of the software component, the combination information being the information relating to "message reception", "message transmission", "message writing" and "message reading".

FIGS. 2A and 2B show a second example of the conventional technology. Specifically, the second example is disclosed in the Japanese Laid-Open Patent Publication No. 3-191429 whereby messages are collected by a message management part 14, and a message is sent after a virtual destination is converted into a real destination by using a destination correspondence table 15.

In the second example, the message management part 14 converts only the destinations by referring to the destination correspondence table 15. The interface for the message is written in a static manner within the program of the software component (PKG). For example, synchronous control such as message queuing is executed within the program of the software component.

Referring to FIG. 2A, a software component PKG-B sends two messages, i.e. a message a and a message b, to a software component PKG-A. The message comprises: destination information which specifies the message management 14 as the destination; a virtual destination; an interface; and a content of the message.

It is assumed that the message a sent by the software component PKG-B has a virtual destination "001". Accordingly, the message management part 14 refers to the destination correspondence table 15 on the basis of the virtual destination (001) of the message a. It is found as a result of the reference that PKG-A is the destination. As in the case of the message a, the message management part 14 refers to the destination correspondence table 15 on the basis of the virtual destination (001) of the message b. After it is found that PKG-A is the destination of the message, the content of the message b is sent to the software component PKG-A.

When the message b, which is one of the messages sent by the software component PKG-B, has its destination changed to the software component PKG-C, the program of PKG-B is modified so that the virtual destination for referring to the destination correspondence table 15 is changed from "001" to "003", as shown in FIG. 2B.

FIGS. 3A and 3B also show another aspect of the second example of the conventional technology. In this case, the destination is changed by modifying the program. When the message sent from the software component PKG-B to the PKG-A has its destination changed to the software component PKG-C, the content of the software component PKG-B to be sent is modified by modifying the program of the software component PKG-B so that the information that the software component PKG-C is capable of receiving is sent.

FIG. 3A shows a case where the interface is modified and the virtual destination is changed to "001" before sending the message so that the software component PKG-A can receive the message from the software component PKG-B. FIG. 3B shows a case where the destination of the message sent from the software component PKG-B is changed to the software component PKG-C such that the interface of the message is rewritten so as to correspond to the new destination, that is, so that the software component PKG-C can receive the message.

A description will now be given of management of the operation mode of the redundancy system in the conventional system. Conventionally, the operation mode is managed by an application. Specifically, when the operation is switched from one mode to another, the process is carried out in the new mode. The operation mode management is performed such that, if the active operation mode is effective in the application, the acquired data is evaluated and the result is output, and if the test mode is effective, the acquired data is discarded and the test data is evaluated. In this way, the operation mode is always monitored so that the manner in which the process is executed is selected to be compatible with the effective operation mode.

FIG. 4 is a diagram explaining the operation mode management system in the conventional system.

The operation mode in the redundancy system is determined such that, when a request for switching modes is input to the application software (S1), the application software refers to the operation mode of the system to which it belongs. First, the application software determines whether or not the system to which it belongs to is being operated in the test operation mode (S2). If it is determined that the system is being operated in the test operation mode, the data acquired during the execution of the application software is discarded so that the test data is evaluated (S3). If it is determined that the system is being operated in the active operation mode by referring to the mode of the system (S4), the data acquired during the execution of the application software is evaluated and output (S5). If it is determined that the system is being operated neither in the test operation mode nor in the active operation mode, the process is executed according to a mode other than these two modes, or an determination of error is made (S6).

However, the conventional methods described above have the following problems.

As for the first example of the conventional technology, information relating to the combination such as the method of combining software components and the target software component to be combined is set in the program. Therefore, a modification of a program is necessary when the apparatus/process configuration or the combination of software components is to be changed. Another problem of the first example of the conventional technology is that, if the method of combining software components is such that it allows for all the possible combinations, that is, if the socket is made compatible to all the possible combinations, a large degree of degradation in the performance results because of an increase in the OS overhead. Still another problem is that, since the information relating to the combination is set in the program, a complex software structure results so that it is difficult for an outsider to modify the program.

The second example of the conventional technology has a problem in that, since the program should be modified when the destination of the message is to be changed, independence of software components suffers.

Another problem of the second example of the conventional technology is that, in a software component in which messages are held in a queue, the program is to be modified when the number of messages held in a queue, the process to be executed when a message that should not be held in a queue has arrived, or the time that should be allowed for before a message arrives is to be modified.

In the second example of the conventional technology, the interface distribution should be modified when the message originator or the content of the sent message is modified. This modification of the interface means a modification of the program. Hence, independence of the software components suffers.

The second example of the conventional technology also has a problem in that it is impossible to detect an incident in which an activation message is sent to a plurality of software components, because the management of a plurality of messages is performed within the software component. Still another problem is that, if a modification occurs in one portion of a stream of successive messages, the program of all the related software components should be modified, thus decreasing the degree of independence of the software components.

Still another problem of the second example of the conventional technology is that the mere modification of the destination listed in the destination correspondence table does not serve the purpose, and the interface should also be modified so as to be compatible with the new destination, because different software components have different interfaces.

Further, the operation mode management system in the conventional redundancy system is such that the switching of the operation modes is managed by the application software. Hence, it is necessary to reform the application software whenever the application is used in a different system or whenever a new operation mode is added.

SUMMARY OF THE INVENTION

Accordingly, a general object of the present invention is to provide a shared information reference system in which application software is managed independently, and in which it is not necessary to modify individual applications.

A more specific object of the present invention is to provide a method of combining software components whereby software components can be developed independently, and message exchanging between the software components can be managed without modifying the individual software components.

Still another and more specific object of the present invention is to provide an operation mode management system whereby an addition of an operation mode or a transition to another system can be achieved without modifying the application software.

Still another and more specific object of the present invention is to provide a message exchanging system in which the sending of a message from a software component is not dependent on the destination software component.

The execution control system of the present invention comprises: execution control of a plurality of software components produced according to a predetermined standard; message exchanging between the software components; and a main/standby operation mode switching performed when the software components are executed, said execution control system comprising: shared reference information containing procedure information to be referred to by the software components when any of the software components issues an execution request information; and control function which refers to the shared reference information when the execution request information is issued by any of the software components, combines necessary ones of the software components, and controls the execution of the combined ones of the software components.

According to the present invention, software components produced according to a standard can be combined in any desired manner and executed, because the same body of information can be referred to in developing software for a computer system handling real-time information.

Since the software component used and the process containing software components are defined in the shared reference information at the time of customization, the incorporating of the specified software, the setting of the operating conditions of the software components, and the operation control of the processes can be achieved. Hence, it is possible to build a computer system adapted to a target application without modifying the program of the software components.

Further, the present invention allows constituent software components to be defined for each process within the system at the time of customization. Therefore, is possible to combine a plurality of software components in a single process, or to assign a software component to a plurality of processes, without modifying the program. Hence, there is no need to build a program from a scratch.

In the present invention, exchanging of execution request information between software components is conducted such that destination information is attached to the execution request information at the time of customization. Hence, it is possible to combine a software component with any specified software component without modifying the program to adapt to the process sequence of the target system. Accordingly, it is not necessary to perform processes such as the modification of the interface of individual software components to adapt to the software component to be combined to.

Another feature of the present invention is that the same procedure is employed throughout in combining software components, that is, in delivering the execution request. The control means of the present invention ensures that the execution request information is delivered using a method best adapted to the environment of the software component (defined at the time of customization) to be combined to.

According to another aspect of the present invention, the result obtained from the process of the requested software component is delivered to the requesting software component such that the same procedure specified by the execution request information is employed, and such that the control means automatically issues and transfers the process in the most appropriate method.

In the message exchanging system of the present invention, the format of the interface information to be delivered by a message is turned into data and edited by the control means so as to adapt to the interface of the software component to which the message is delivered. Therefore, it is possible for the transmitting software component to send a message without recognizing the interface information of the software component to which the message is sent.

In the present invention, when the control means of the present invention receives messages from a plurality of software components and sends the messages to one software component, the control means edits the plurality of messages into one message on the basis of the destination information before transmission so that the scale of traffic is reduced.

In the present invention, when one transmitting software component transfers a message to a plurality of software components, the control means edits the message before transfer. Therefore, it is not necessary for as many processes as the number of software components to be repeated within the software component in a broadcast system or the like, only modification of the shared reference information being necessary irrespective of the increase or decrease in the number of destinations.

In the present invention, exclusion control is possible such that a stream of successive messages is dealt with as an application, and the application is monitored either during a period beginning at the moment when an application start message is received and ending at the moment when an application end message is received or until the time defined in the shared reference information expires, and such that messages other than those defined in the shared reference information are not accepted as valid messages. In this way, it is possible to two prevent application processes from being activated erroneously.

The operation mode management system of the present invention allows automatic switching of process sequences for adapting to the operation mode when different process sequences (data flow) are executed in different operation modes, as in the case of the operations of main/standby systems of a redundancy system or in the case of a test mode operation at the time of the maintenance. Therefore, it is not necessary for the software component to recognize the operation mode.

BRIEF DESCRIPTION OF THE DRAWINGS

Other objects and further features of the present invention will be apparent from the following detailed description when read in conjunction with the accompanying drawings, in which:

FIG. 5 shows the principle and construction of the present invention;

FIG. 9 shows an example of combination information according to the first embodiment;

FIG. 14 shows the construction of a definition body of an application process sequence according to the second embodiment;

DESCRIPTION OF THE PREFERRED EMBODIMENTS

FIG. 5 shows the principle and construction of the present invention. Referring to FIG. 5, software components 10 are created in accordance with a predetermined standard. Shared reference information 40 contains information which the software components 10 refer to when execution request information is issued from any of the software components 10 so that the execution control of the software components 10 and the message exchanging between the software components 10 are performed, and 10 so that the execution of the software components 10 either in a main system or in a subsystem in a redundant system is realized. Control means 20 refers to the shared reference information 40 on the basis of the execution request information issued by any of the software components 10, combines the software components 10, and controls the execution of the software components 10.

Figure 1:
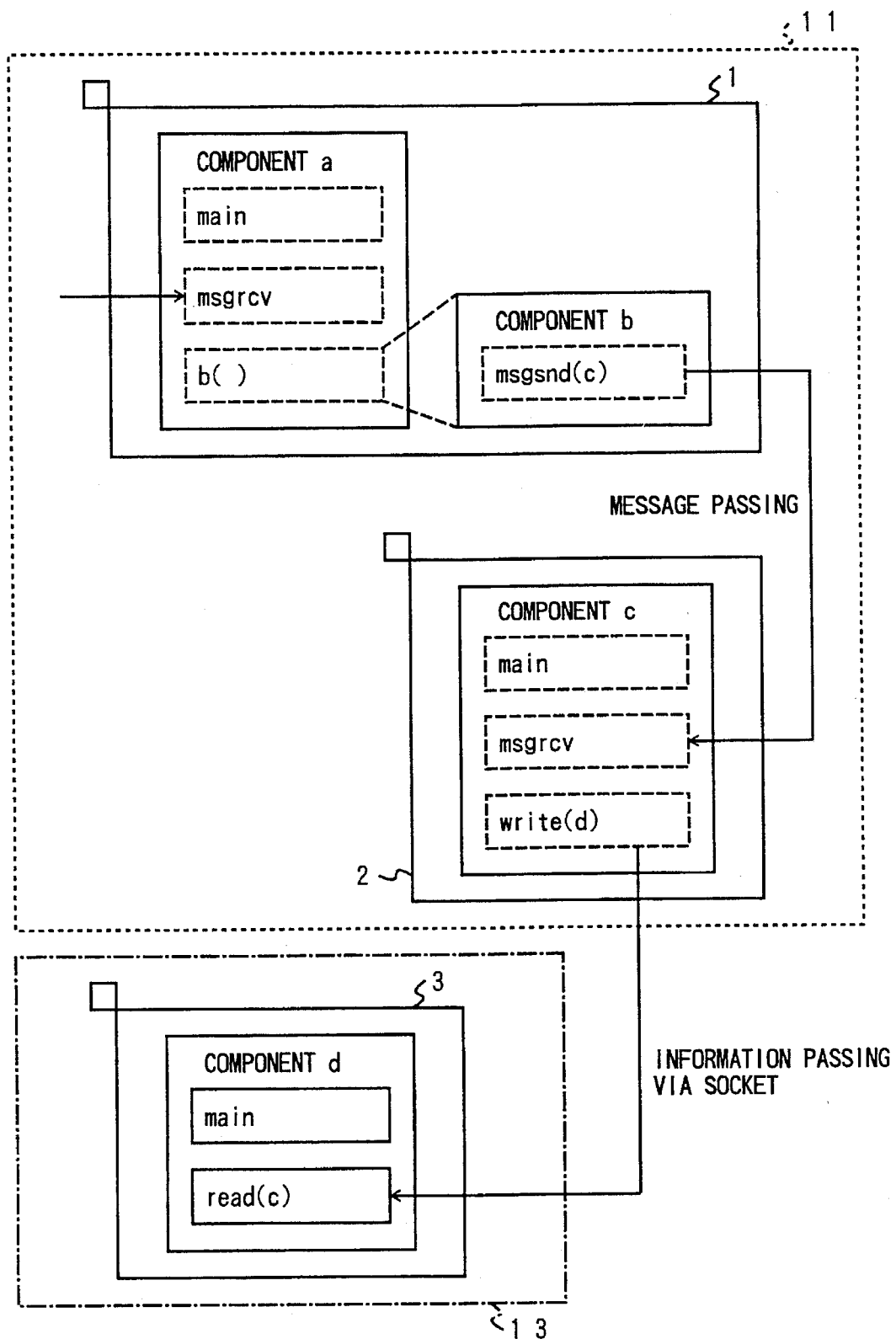
FIG. 1 shows a first example of the conventional technology.
Figure 2A:
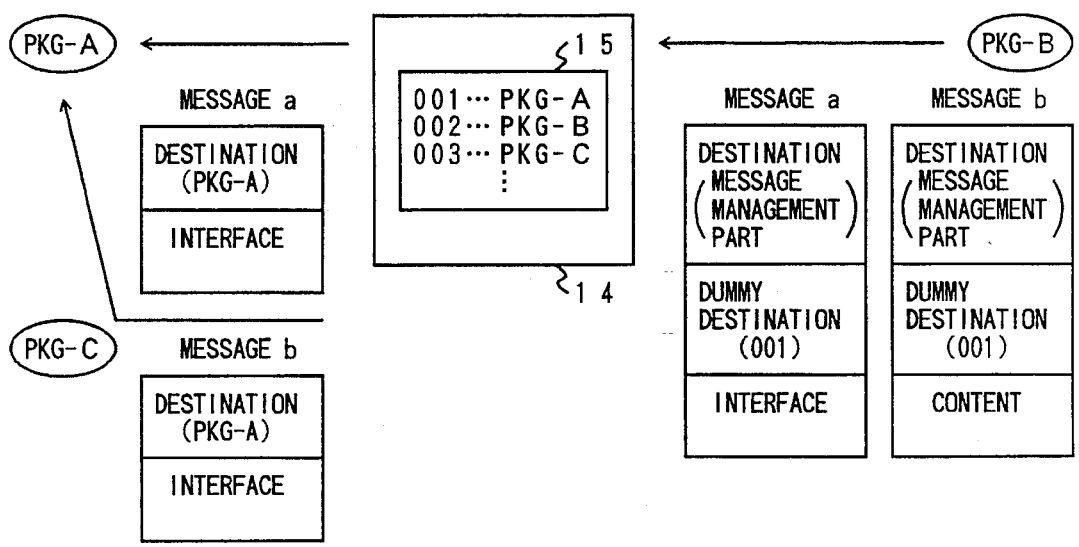
FIGS. 2A and 2B show a second example of the conventional technology.
Figure 2B:
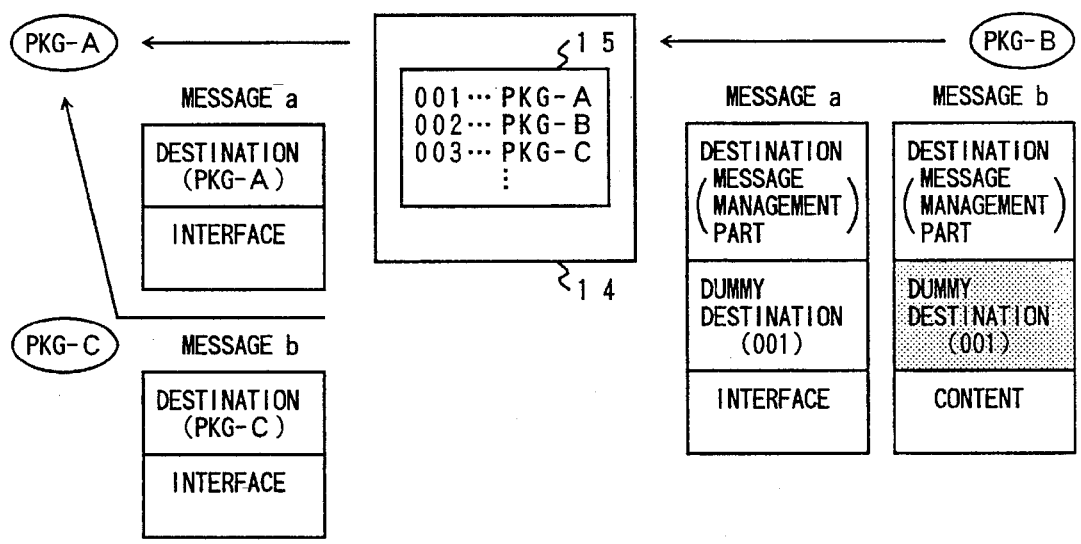
Figure 3A:
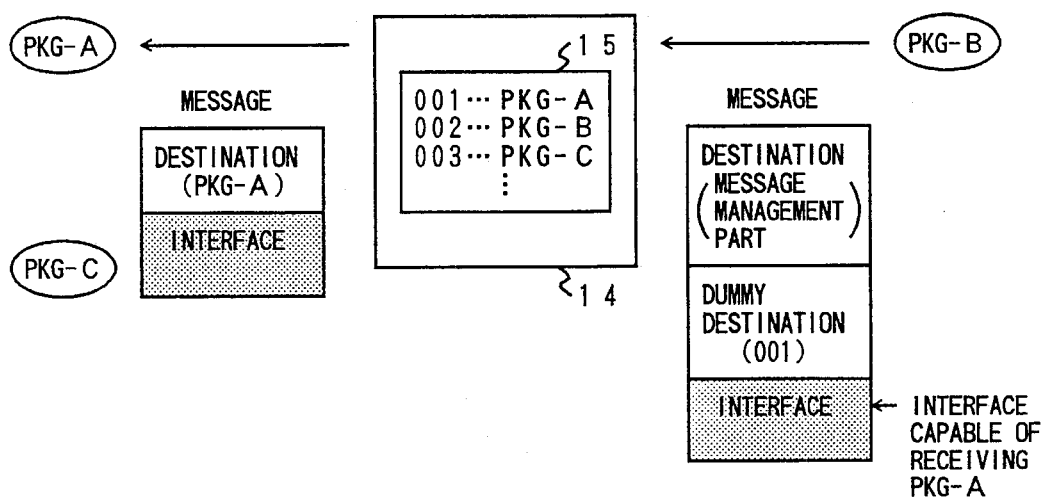
FIGS. 3A and 3B show an aspect of the second example wherein a destination is changed by modifying a program.
Figure 3B:
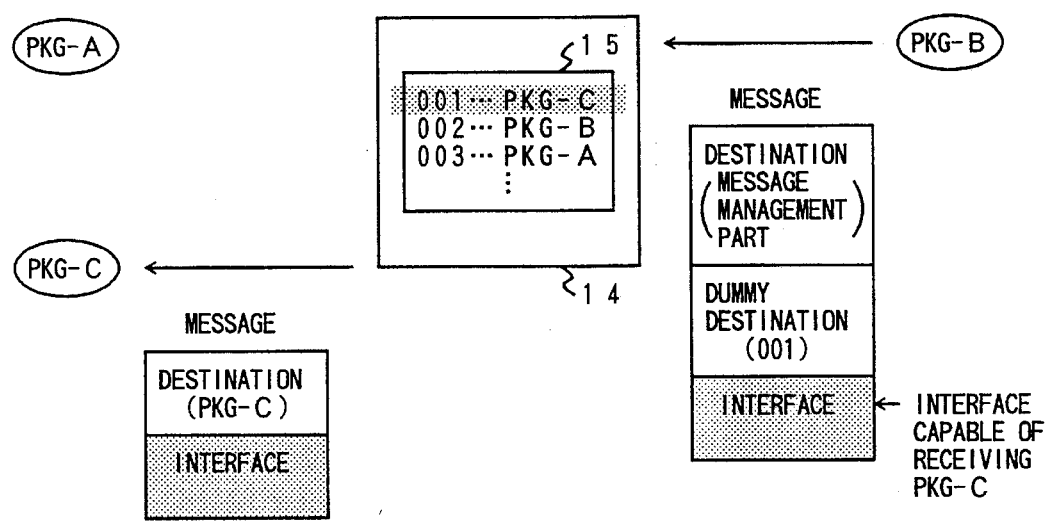
Figure 4:
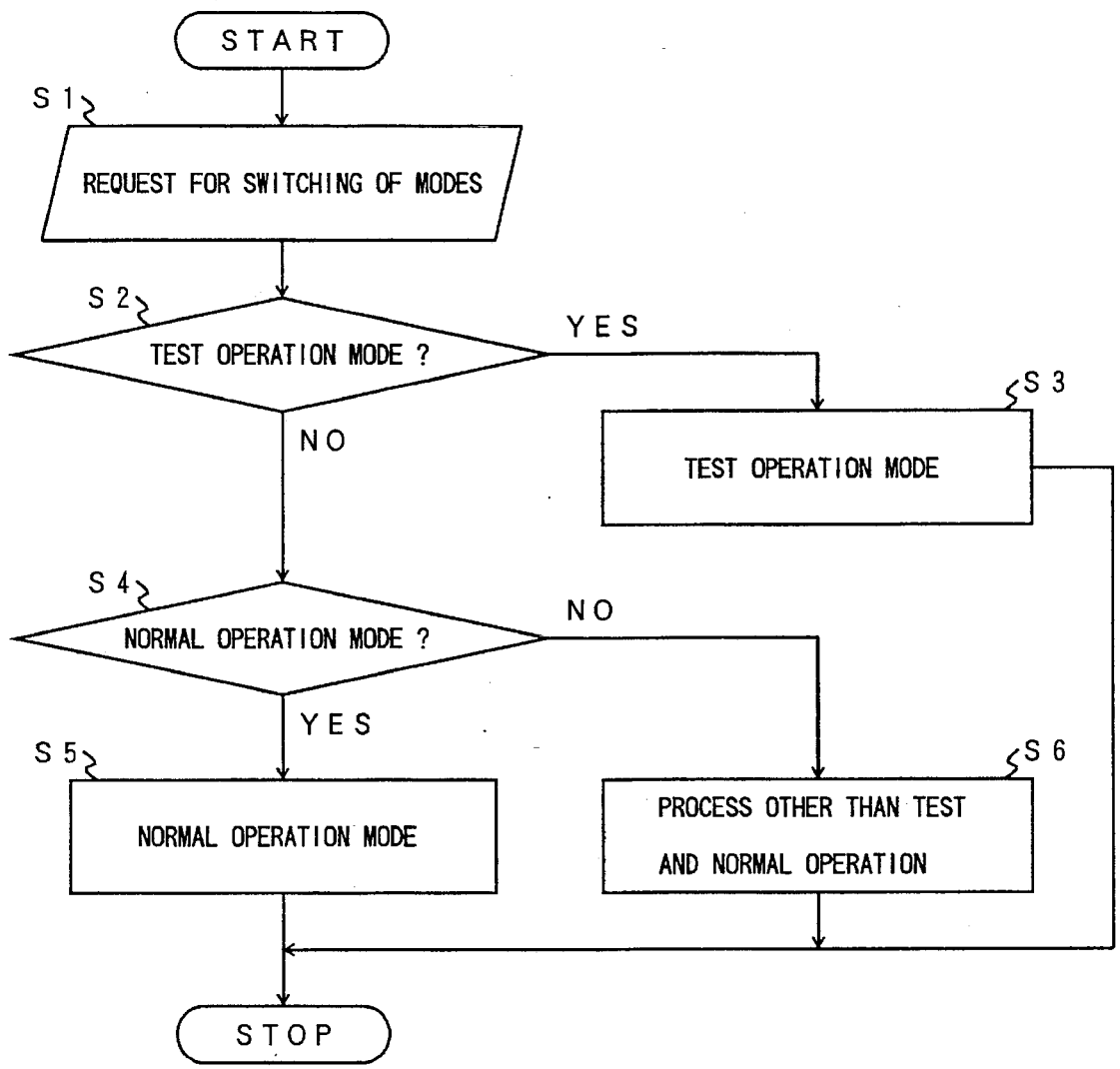
FIG. 4 shows an operation mode management in the conventional system.
Figure 6:
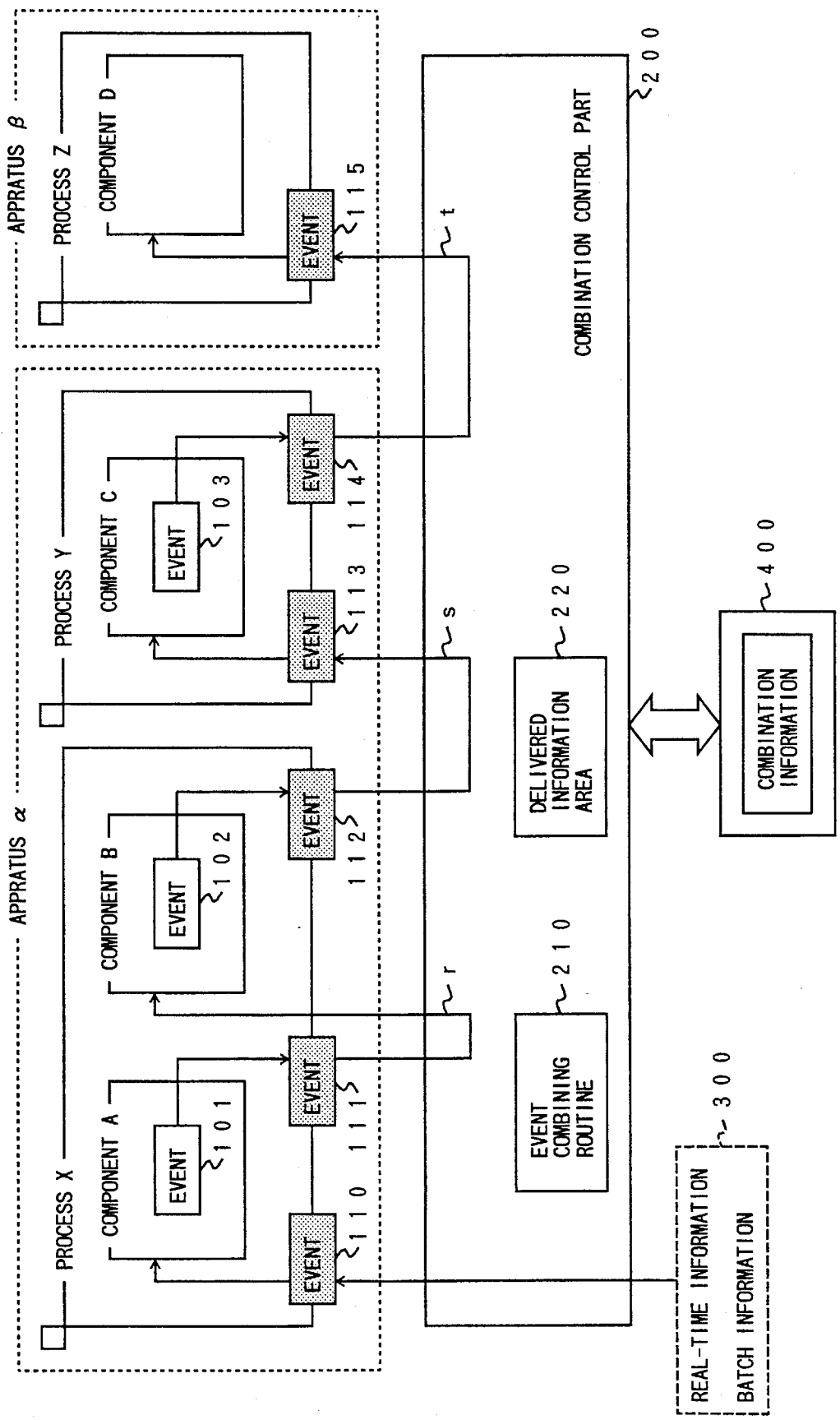
FIG. 6 schematically shows a first embodiment of the present invention.

FIG. 6 schematically shows a software component combination system of a first embodiment of the present invention. The system shown in FIG. 6 includes an apparatus α accommodating a process X and a process Y, an apparatus β accommodating a process Z, and a combination control part 200. The combination control part 200 includes an event combining routine 210 and a delivered information area 220. The process A contains a component A including an event 101, and also contains a component B including an event 102. The process Y contains a component C including an event 103. The process Z of the apparatus β contains a component D. Real-time information or batch information 300 is input to the combination control part 200, whereupon the combination control part 200 outputs the information 300 to the event of the process to be executed. Combination information 400 is defined by the combination control part 200.

Figure 7:
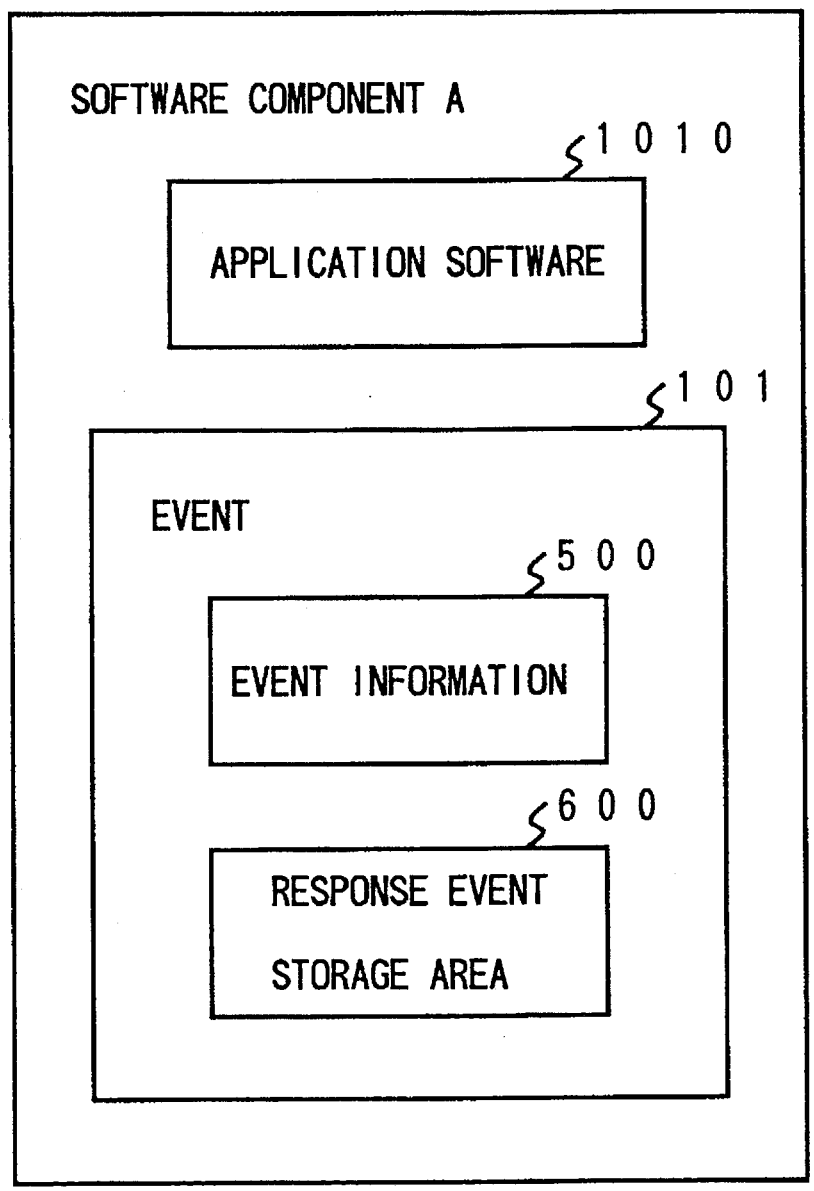
FIG. 7 shows the construction of a software component according to the first embodiment.

FIG. 7 shows the construction of the software component of the first embodiment. As shown in FIG. 7, all the software components A, B, C and D has an argument which comprises event information 500 and a response event storage area 600. The process is executed in accordance with input event information. When event information is to be sent from one software component to another, the event combining routine 210 is called into the combination control part 200. The argument used in this case are the event information 500 and the response event storage area 600. When a process result is to be delivered from the software component which is executed upon receipt of the event information to the software component which issued the event information, the process result is stored in the delivered information area 220 of the combination control part 200. When the process result is to be returned to the software component which called the event combining routine 210, the process result is returned in accordance with a determination based on a return code included in the event information 500, the determination being such that there is no process result to be returned when the return code is "0", and the process result information has a certain length when the return code is "1".

Figure 8:
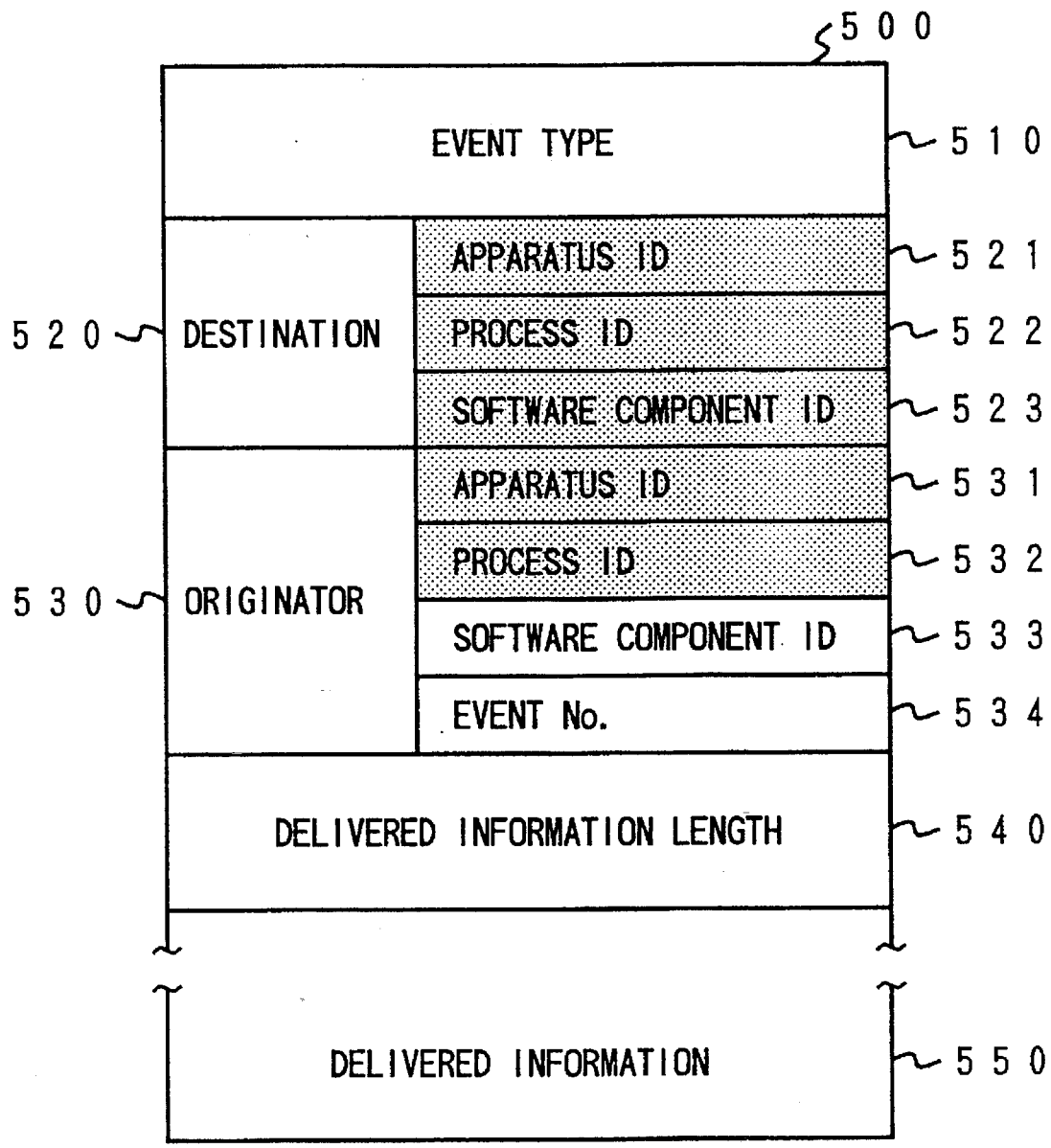
FIG. 8 shows the format of event information according to the first embodiment.

FIG. 8 shows the format of the event information. The event information 500 is used in the argument when the event combining routine 210 is called. Information delivery between software components is realized by calling the combining routine 210, the event information being used as the argument. The format of the event information 500 is common to the transmission event and the response event. The event information includes: an event type 510; destination information comprising an apparatus ID 521, a process ID and a software component ID 523; originator information 530 comprising an apparatus ID 531, a process ID 532, a software component ID 533 and an event number 534; a delivered information length 540; and delivered information 550. The apparatus ID 521, the process ID 522 and the software component ID 523 of the destination information 520 as well as the apparatus ID 531 and the process ID 532 of the originator information 530 should not be set in the software component which issues the event information, and are set by the event combination routine 210 by referring to the combination information 400. The event type 510 may indicate one of the three types of event, namely an event in which the process result is unnecessary, an event in which the synchronization is requested and an event in which the non-synchronization is requested.

Referring to FIG. 6 again, upon receipt of the real-time information or the batch information 300, the combination control part 300 outputs the information 300 to the event of the process to be executed. The combination control part 200 refers to the combination information 400 specifying the combination of processes, so as to control the process of delivering the combination information from one process to another. The combination information 400 is not generated in the software component, but is specified as external information at the time of the customization.

FIG. 9 shows an example of the combination information of the first embodiment. The combination information 400 comprises a software component definition, a process definition and information relating to the target component to be combined. The software definition is set when the customization of the software component is conducted. The process definition specifies software components for each of the processes and the attribute of the software component. Either the resident operation level attribute or the non-resident operation level attribute is specified. The information relating to the target component to be combined comprises the type of request and the destination.

Referring to FIG. 6 again, when the real-time information or the batch information 300 is input to the combination control part 200, a combination procedure function within the process is output to the event 110. When the request information event 101 to be delivered from the process component a to the process component b is input to the combination control part 200, the combination procedure function allows the request information event 101 to be delivered to the component b in the form of a function via an event 111 (function passing r). The combination control part 200 delivers the request information event from the component b to the process Y in the form of a message via events 112 and 113 (message exchanging s). Upon receipt of a request information event 103 to be delivered from the process Y of the apparatus α to the process Z of the apparatus β, the combination control part 200 delivers an event 115 to the process Z using socket communication.

Figure 10:
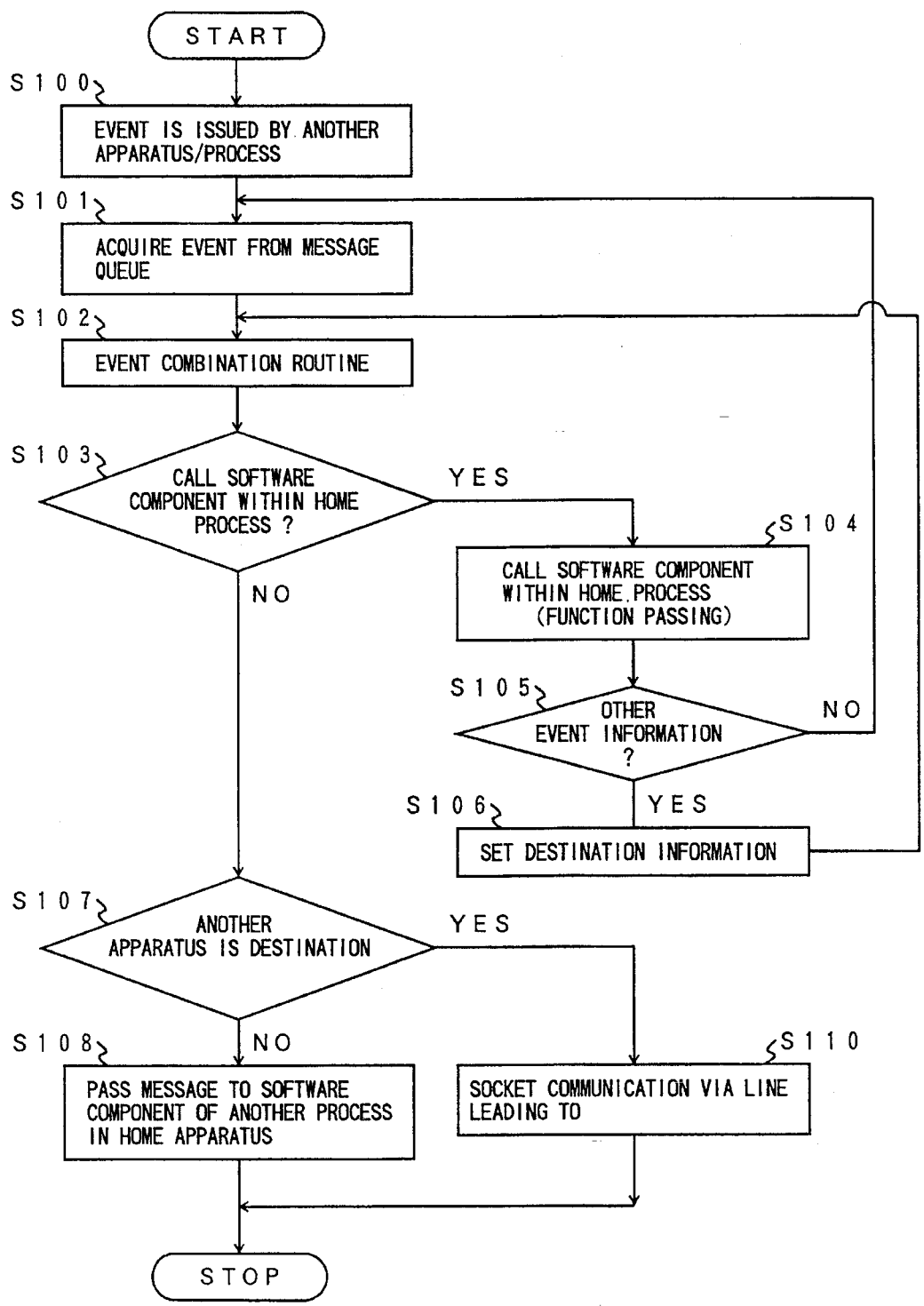
FIG. 10 is a flowchart schematically showing the operation of the first embodiment.
Figure 11:
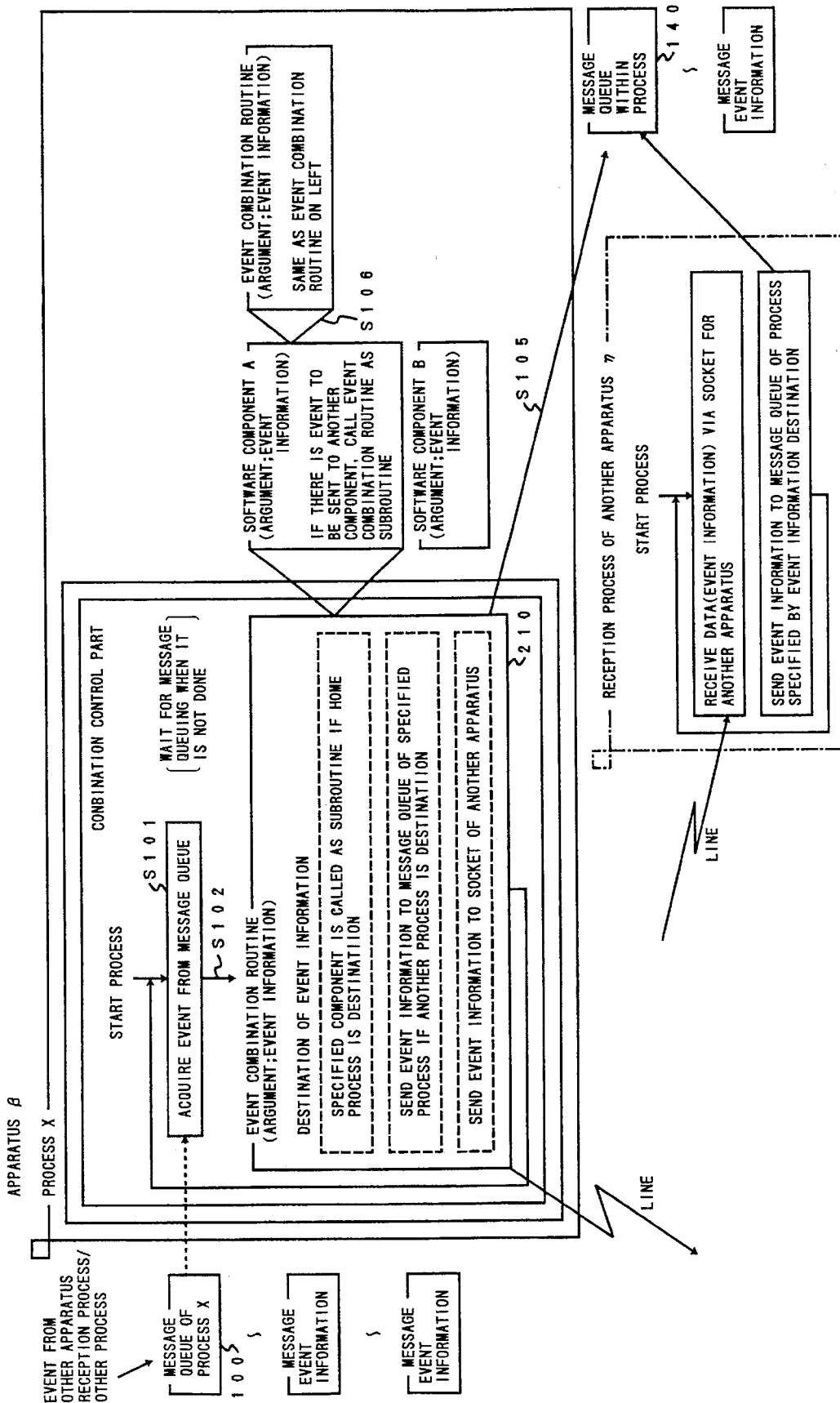
FIG. 11 explains the operation corresponding to the operation shown in the flowchart of FIG. 10.

FIG. 10 is a flowchart schematically showing the operation of the combination control part of the first embodiment. FIG. 11 explains the operation corresponding to the operation shown in the flowchart of FIG. 10. The numerals in FIG. 11 correspond to the numerals indicating the steps of FIG. 10. For the sake of convenience of the description, an area surrounded by a chain line show the operation of the combination control part 200.

S100) An event is issued by another process or in another apparatus to the software component c of the process X.

S101) The combination control part 200 acquires the event 100 issued by the message queue 100 of the process V.

S102) The combination control 200 calls the event combination routine 210, the acquired event being the argument of the called routine.

S103) The event combination routine determines whether the destination of the software specified by the event is the home process or another process by referring to the combination information 400. When the destination component is in the home process, the operation proceeds to S104. When the destination component is not in the home process, the operation proceeds to S107.

S104) When the destination software component is in the home process, the software component in the home process specified by the destination information is called. In the example of FIG. 11, when the destination is the software component A, the destination component (software component A) in the process X is in the home process. In this case, the software component A is called by a function passing, the event being used as the argument.

S105) The software component A is executed, and a determination is made as to whether or not there is other event information. When there is none, the operation proceeds to S101. When there is other event information, the operation proceeds to S106.

S106) The combination control part 200 sets the destination of the combination information 400 in the event information, and the operation proceeds to S102.

S107) A determination is made as to whether or not a software component of another apparatus is the destination. When a software component of another apparatus is the destination, the operation proceeds to S110. When a software component of the home apparatus is the destination, the operation proceeds to S108.

S108) The event information is held in the message queue of the destination process. In the example shown in FIG. 11, the message is passed from the process X to a message queue 140 of another process.

S110) When a software component of another apparatus is the destination, the event information is sent via a line leading to the destination apparatus by socket communication. Another apparatus η receives the event information sent from the other apparatus B and sends the event information to a message queue of the specified process by referring to the destination of the event information.

A description will now be given of the combination information defined by the combination control part 200 at the time of a customization.

Items to be set at the time of the customization include: a list of other apparatuses to be connected; a list of processes in the apparatus; and a list of event destination information specifying destination software components.

(1) As shown in Table 1 below, the list of other apparatuses to be connected comprises apparatus IDs and connected line IDs.

TABLE 1

| LIST OF OTHER APPARATUSES | |
|---|---|
| APPARATUS ID | CONNECTED LINE ID |
| APPARATUS α | HOME APPARATUS |
| APPARATUS β | LINE 5 |
| APPARATUS η | LINE 2 |

Table 1 is utilized such that the event combination routine 210 refers to this table in order to determine whether the destination apparatus of the event information is the home apparatus or another apparatus. This table is also referred to in order to determine the line leading to the destination apparatus of the event information so that the event information can be output to the proper destination.

(2) As shown in Table 2, the list of processes of the apparatus comprises the process IDs and the constituent software component IDs.

TABLE 2

| LIST OF PROCESSES OF APPARATUS | | |
|---|---|---|
| PROCESS ID | CONSTITUENT SOFTWARE COMPONENT ID | |
| PROCESS X | COMPONENT A | COMPONENT B |
| PROCESS Y | COMPONENT C | |

Table 2 is utilized such that the combination control part 200 refers to this table when generating each process so as to recognize which software components are to be used to generate a process.

(3) The list of event destination information specifying destination software components comprises event types and destinations.

TABLE 3

| LIST OF EVENT DESTINATION INFORMATION SPECIFYING DESTINATION SOFTWARE COMPONENTS | |
|---|---|
| EVENT TYPE | DESTINATION |
| a EVENT 1 FROM COMPONENT A | APPARATUS α PROCESS X COMPONENT B |
| b EVENT 2 FROM COMPONENT A | APPARATUS α PROCESS Y COMPONENT C |
| c EVENT 1 FROM COMPONENT B | APPARATUS β PROCESS Z COMPONENT E |
| d EVENT 3 FROM COMPONENT A | APPARATUS β PROCESS Z COMPONENT D |

Upon receipt of a request for sending an event from a software component, the event combination routine 210 refers to Table 3 on the basis of the ID of the software component originating the event information and on the basis of the event ID number, so as to set the destination within the event information.

A description will be given below of the method of passing event information between software components, between processes and between apparatuses, by using the above combination information.

1) In the following description of the event information passing between software components, it is assumed that the event information is passed within the home process of the home apparatus. Once called, the event combination routine 210 of the combination control part 200 refers to the event destination information specifying destination software components, the event information being used as the argument for the event combination routine 210 called. If the event ID number of the event information is "EVENT 1 OF SOFTWARE COMPONENT A" shown in FIG. 11, the destination of the event information is "COMPONENT B CONTAINED IN PROCESS X OF APPARATUS α". In the example of FIG. 11, the software component A and the software component B are contained in the process X so that the software component A calls the software component B.

2) A description will be given next of a case in which event information whereby a first software component calls a second software component in another process is issued. The software component A calls the process Y such that when the event 2 is issued from the software component A, it is determined by referring to the entry "APPARATUS e PROCESS Y" that the software component to be called is the software component C. In this state, the message queue event information of the process Y is sent.

3) A description will be given next of a case in which event information whereby a first software component calls a second software component of another apparatus is issued. When the software component A issues the event 3 for calling the apparatus β, the event combination routine 210 refers to the list of event destination information specifying destination software components (Table 3). As a result of the reference, it is found that the software component D of the process Z of the apparatus β is called. Thereafter, the event combination routine 210 sends the event information to the socket of the line leading to the apparatus β. The event combination routine 210 refers to Table 1 so as to obtain the ID of the line connected to the target apparatus. In the case of the apparatus β, the event information is sent by using the line 5. The process Z of the apparatus β obtains the event from the message queue. If the message is not held in the queue, the process Z stands by until the message is held in the queue. The destination specified by the event information thus acquired is referred to so as to determine whether the home apparatus or another apparatus is the destination. When another apparatus is the destination, the ID of the line connected to that apparatus is retrieved so that the event information can be sent, in a manner similar to the above. When the home apparatus is the destination, the specified software component is called as a subroutine and executed. When the process is completed, the software component is automatically returned to its source.

The software component is activated by being called by the event combination routine 210 when a request for a process occurs. When the process is completed, the process result is created and the software component is returned to its source. In this state, the event type in the event information is referred to so that a determination is made as to whether or not the software component that originated a request requires the process result. When the process result is required, it is determined whether the synchronization is requested or the non-synchronization is requested. Further, the method of delivering the process result is determined. The methods of delivering the process result include the following.

a) When the software component that issued the event information does not require the process result, the combination control part 200 does not deliver the process result.

b) When the synchronization is requested, the software component that issued the event information stands by for the delivery of the process result. When the requesting software component and the requested software component are found in the same process, the delivery is done via the argument when the function is returned. When the requesting software component and the requested software component are found in different processes within the same apparatus, the delivery is done via the message queue. When the requesting software component and the requested software component are found in different apparatuses, the delivery is done via the socket.

c) When the non-synchronization is requested, the process is continued and the process result is delivered separately.

When the requesting software component and the requested software component are found in the same apparatus, the delivery is done via the message queue. When the requesting software component and the requested software component are found in different apparatuses, the delivery is done via the socket.

A description will now be given of a second embodiment of the present invention, which embodiment concerns the message exchanging between software components.

Figure 12:
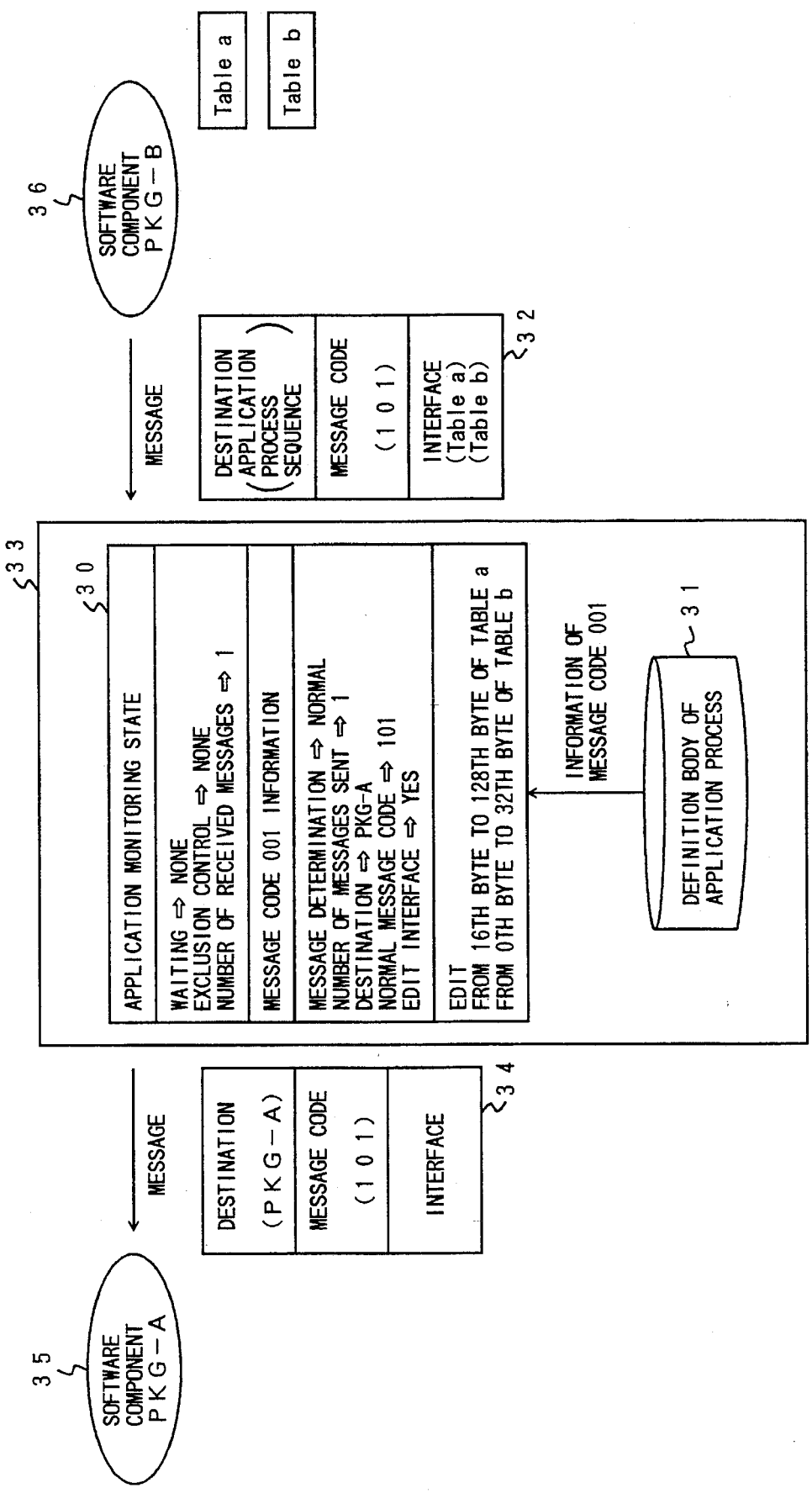
FIG. 12 shows the construction of a message exchanging system according to a second embodiment of the present invention.

FIG. 12 shows the construction of the message exchanging system of the second embodiment. A message 32 sent by requesting software component 36 comprises: a destination (application process sequence); a message code; and an interface. The requesting software component 36 has tables a and b, and the tables a and b have transmission interfaces. The destination of the message 32 sent by the requesting software component 36 is always the application process sequence 33. The message code is defined to be "001" for example, in a definition body 31 of the application process sequence.

Figure 13:
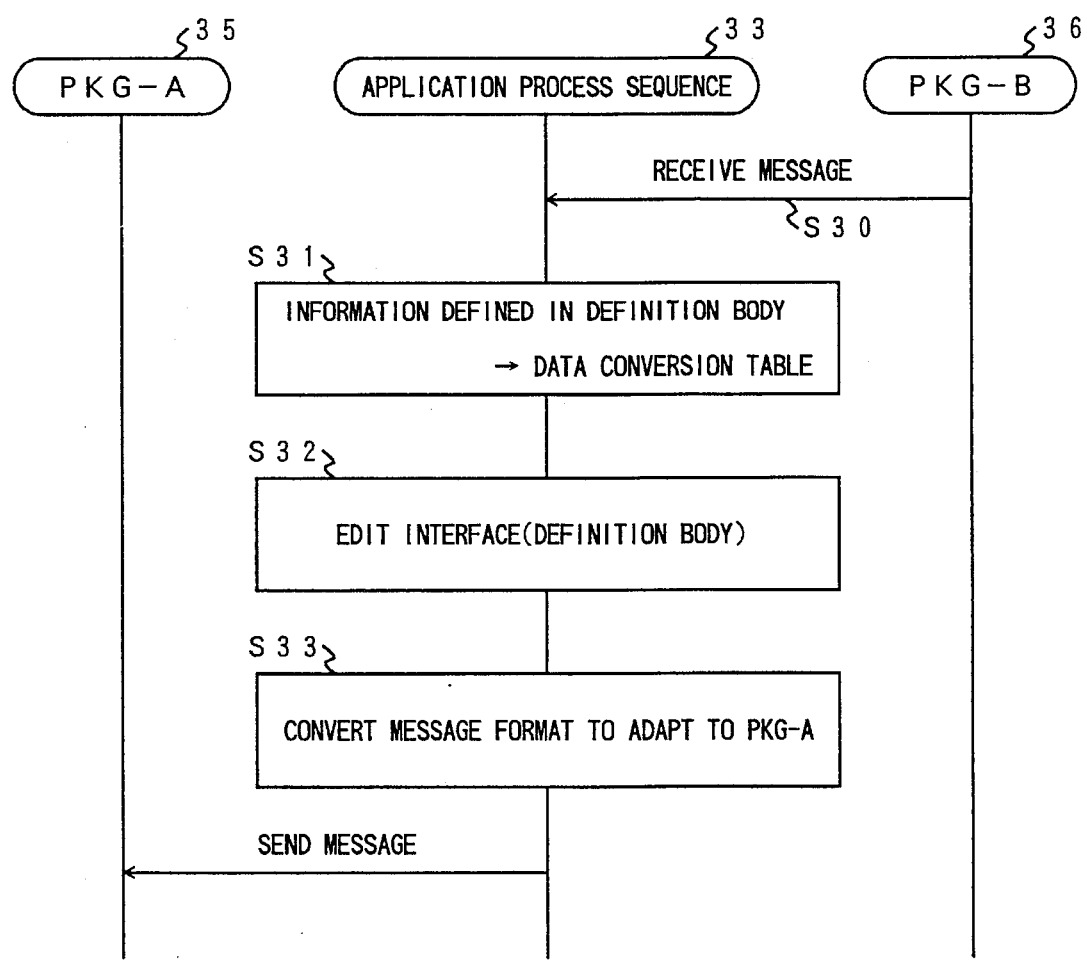
FIG. 13 shows a sequence of message exchanging according to the second embodiment.

FIG. 13 shows a sequence chart showing the sequence of message exchanging of the second embodiment. The application process sequence 33 receives the message 32 from the software component 36. The message 32 has the application process sequence 33 as the destination, and the message code thereof is "001". The message 32 is received via the interface, which is implemented by the tables a and b (S30). The application process routine 33 refers to the definition body 31 by using the message code "001" (a detail 300 of defined items is an example of the detailed content of the defined information relating to the message code "001" within the definition body) so as to convert the message format (S31). Portions of the tables a and b sent as interfaces which portions are defined in the application process sequence definition body 31 are extracted and edited as transmission interfaces (S32). The edited transmission interfaces are converted to have the format of the message 34 to be sent to the receiving software component 35 (S33). The message 34 comprises: a destination; a message code; and an interface. The message 34 having the receiving software component 5 (PKG-A) as the destination and the message code of "101" is sent (S34).

FIG. 14 shows the construction of the definition body of the second embodiment. The definition body 31 comprises: an application count 3001 in which is set the number of applications that are defined in a stream of successive messages; and application information 3002 which defines the applications which total the application count 3001. The application information 3002 comprises: an application ID number 3003 starting from 1; an application monitoring time 3004 at which each of the applications is monitored; application start message information 3005 which defines message information prompting the start of the application; application end message information 3040 which defines message information indicating the end of the application; message information 3041 which defines various kinds of message information.

The application start message information 3005 comprises: a wait time 3006 during which the message is waited for; received message information 3008 constructed of a received message count 3009 and received message detailed information 3010; and sent message information constructed of sent message count 3014 and sent message detailed information 3015.

The time 3006 during which the message is waited for is the information included in the received message information 3008 and defines the wait time when there are a plurality of received messages. An excluded type information 3007 specifies whether or not an unwanted message arriving during a stand-by state is to be received or discarded. When there is only one message received, the time 3006 and the excluded type information 3007 are not defined. The received message information 3008 defines the information for all of the received message. The received message count 3009 defines the number of received messages. The received message detailed information 3010 provides definitions which total the number defined by the received message count 3009. A received message code 3011 defines the message code to be received. Message determination information 3012 defines the information for determining whether the message content of the received message code 3011 is correct.

The sent message information 3013 defines the information for all the sent messages. The sent message count 3014 defines the number of messages sent. The sent message detailed information 3015 provides the definitions which total the number defined by the sent message count 3014. Destination information 3016 defines the information relating to the destination of the sent message. Normalcy information 3017 defines the information of the message sent when the received message is correct. Abnormality information 3018 defines the information of the message sent when the sent when the received message is abnormal. A message code 3019 is the message code of the sent message. Interface editing information 3020 defines the information relating to the method of editing the interface of the received message. The application end message information defines the message information which prompts the termination of the monitoring of the application. The message information defines the information relating to general message exchanging. Items and contents defined are the same as that of the application start message information.

[Operation of receiving application start message]

Figure 15:
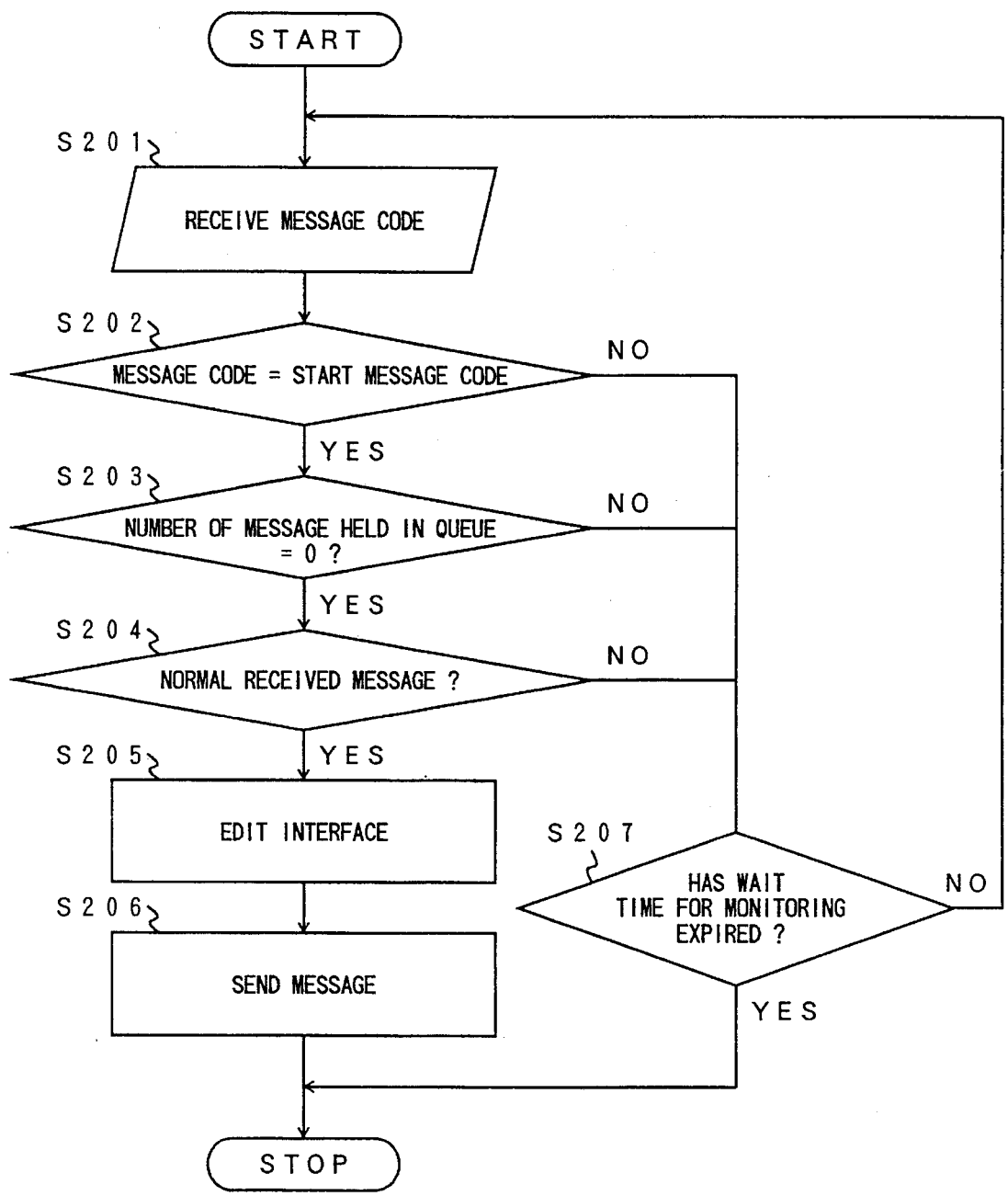
FIG. 15 is a flowchart showing the operation, according to the second embodiment, of the application process sequence when an application start message is received.

A description will next be given of an operation wherein the software component receives the application start message. FIG. 15 is a flowchart showing the operation, according to the second embodiment, of the application process sequence effected when the application start message is received.

When a message not belonging to the application monitoring process is received by the application process sequence 33 (S201), it is determined whether or not the message code is the same as the received message code 3011 of the application start message information 3005 (S202), and whether or not the time 3006 is equal to 0 (=does not wait) (S203). Thereafter, it is determined by the message determination information 3012 whether or not the message is normal (S204). If all of the steps S202 through S204 yield an affirmative answer, the application process sequence 33 sends the messages which total the number specified by the sent message count 3014 on the basis of the sent message detailed information 3015 (S206). Since the received message has been determined to be correct, the received destination is set in the destination information 3016, the message code corresponding to the normal message is set in the message code 3019 of the normalcy information, and the interface information utilized in the reception is set in the interface editing information 3020 (S205). When the interface editing is finished, the message is sent (S206).

The monitoring of the application whose ID number is set in the application ID number 3003 is monitored until the application monitoring time 304 is reached (S207).

[Operation of receiving application end message]

Figure 16:
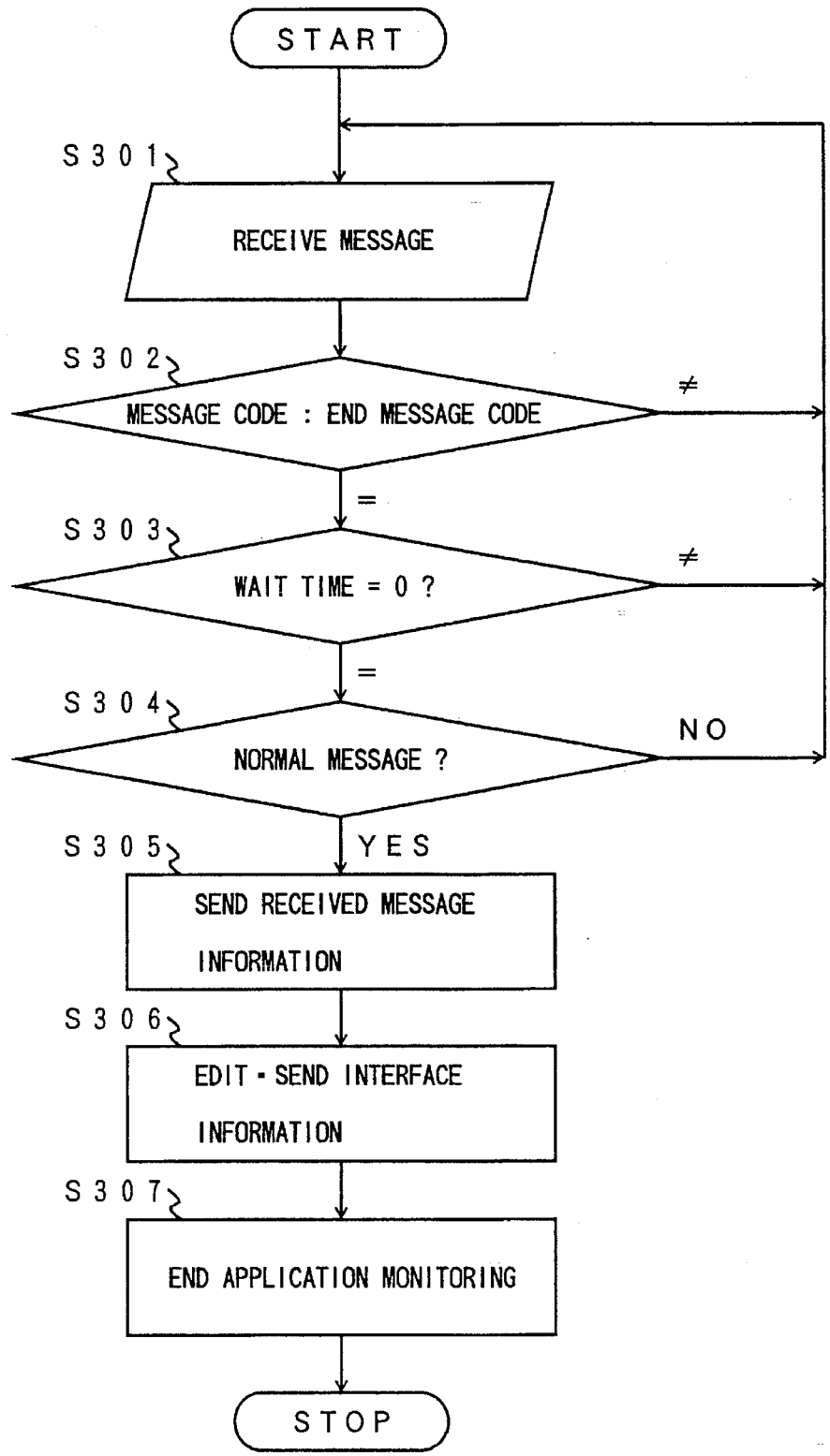
FIG. 16 is a flowchart showing the operation, according to the second embodiment, of the application process sequence when an application end message is received.

A description will now be given of the operation carried out when the software component receives an application end message. FIG. 16 is a flowchart showing the operation, according to the second embodiment, of the application process sequence when the application end message is received.

It is assumed that the application process sequence 33 receives a message while monitoring the application (S301). When it is found that a received message code 3022 is the same as the application end message code (S302), wait time 3023 is equal to (=does not wait) (S303), and it is found by message determination information 3024 that the message is normal (S304), the received message information is sent on the basis of the sent message detailed information corresponding to the defined message count (S305). As in the case of the reception operation of the application start message, when the message is normal, the destination is set in destination information 3027, the message code is set in a sent message code 3028, and the received interface is edited in accordance with an interface editing information 3029. The message is sent on the basis of the edited interface (S306). Finally, the monitoring of the application whose ID number is set in the application ID number 3003 is terminated (S307).

[Operation of receiving a message]

Figure 17:
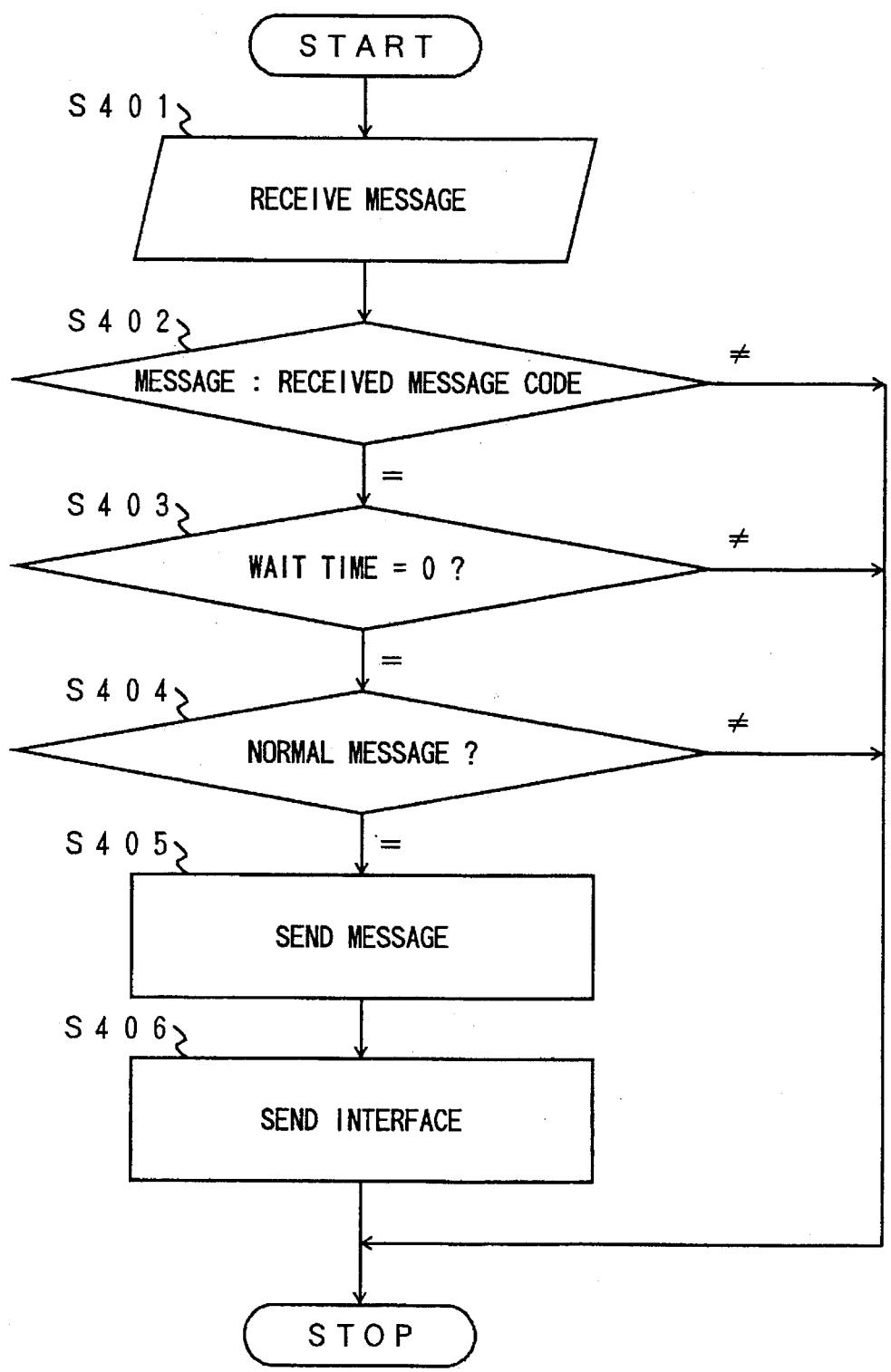
FIG. 17 is a flowchart showing the operation, according to the second embodiment, of the application process sequence when a message is received.

A description will now be given of the operation carried out when the software component receives a message. FIG. 17 is a flowchart showing the operation, according to the second embodiment, of the application process sequence when a message is received. It is possible for the software component to send and receive a message even if the software component is not monitored as an application.

It is assumed that the application process sequence 33 receives a message (S401). When it is determined that the received message code is the same as the message code of the received message information (S402), and a wait time 3031 is equal to 0 (does not wait) (S403), and it is determined that the message is normal on the basis of message determination information 3032 (S404), the application process sequence 33 messages which totals the message count defined by a sent message count 3033 on the basis of sent message detailed information 3034 (S405). As in the case of the reception operation of the application start message, when the message received is normal, the destination is set in destination information 3035, the message code is set in a sent message code 3036, and the received interface is edited in accordance with interface editing information 3037. The message is sent on the basis of the edited interface (S406).

By carrying out the above described process, it is not necessary to modify the software component (program) in order to change the message content and the destination to which a message is to be sent, the only modification required being in the definition body 31 of the application process sequence 33. By allowing the application process sequence to carry out synchronization control and the distribution control, the modification in these control operations is also possible by modifying the definition body of the application process sequence. Since a stream of successive messages is monitored as an application by the application process sequence 33, modification in the management of a plurality of messages can also be effected by modifying the definition body of the application process sequence.

[Operation of sending merged messages]

An explanation will be given of the operation of merging messages from a plurality of software components and sending the resultant message.

Figure 18:
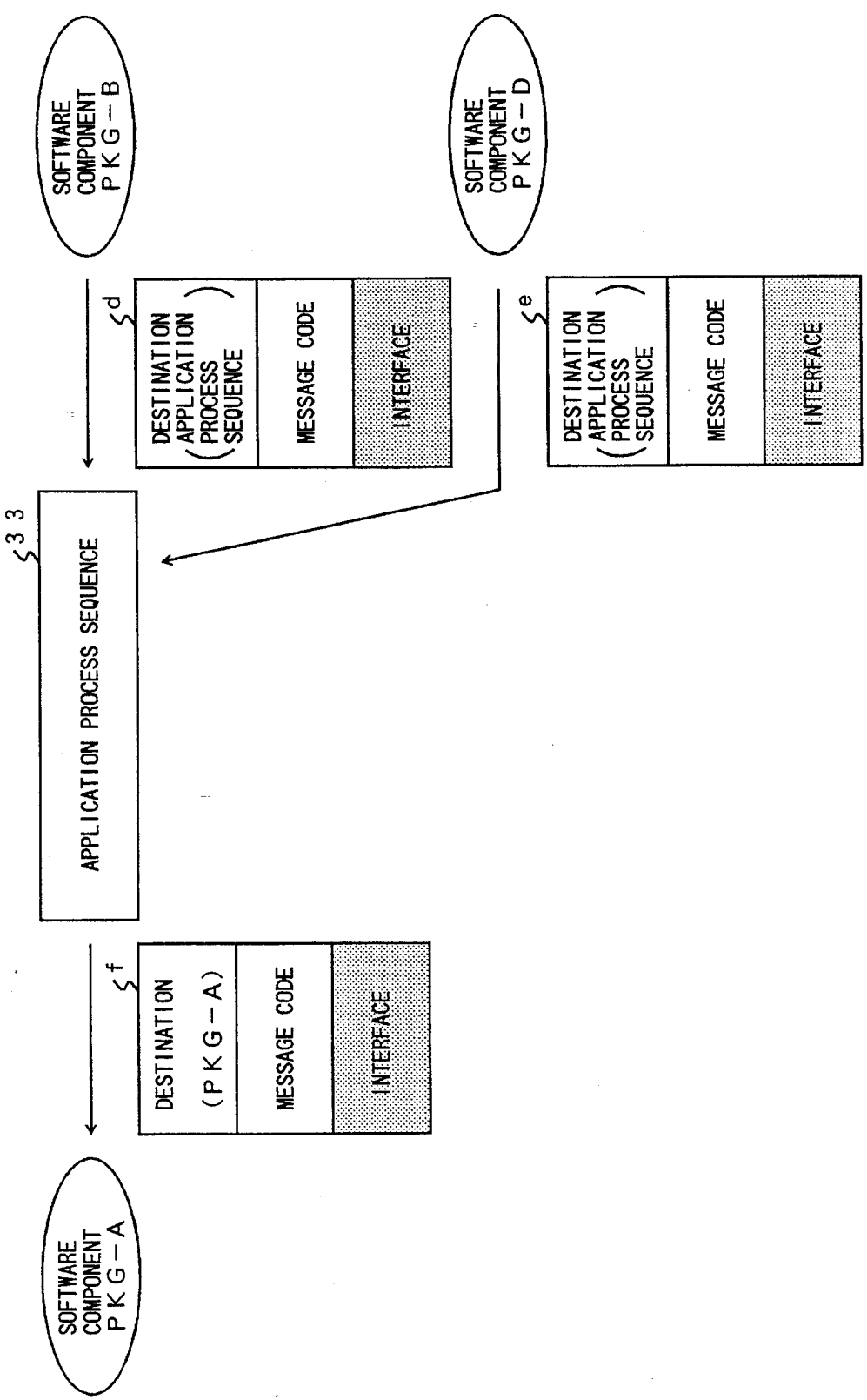
FIG. 18 shows a second example of the second embodiment.

FIG. 18 explains a second example of the second embodiment.

In the second example shown in FIG. 18, messages from the software component PKG-B and the software component PKG-D are waited for and merged into one message, whereupon the resultant message is sent to the software component PKG-A. The interface of the sent message is obtained as a result of editing the interface of the received two messages.

The application process sequence 33 defines, in the definition body 31, the number of messages to be waited for, the wait time thereof, the number of messages to be sent after the messages waited for have been received, the destination of the sent message(s), and the editing information of the sent message(s). When the application process sequence receives a message from the software component PKG-B and when the wait time expires before the application process sequence receives a message from the software component PKG-D, the application process sequence 33 sends a abnormality message to the software component PKG-A.

Figure 19:
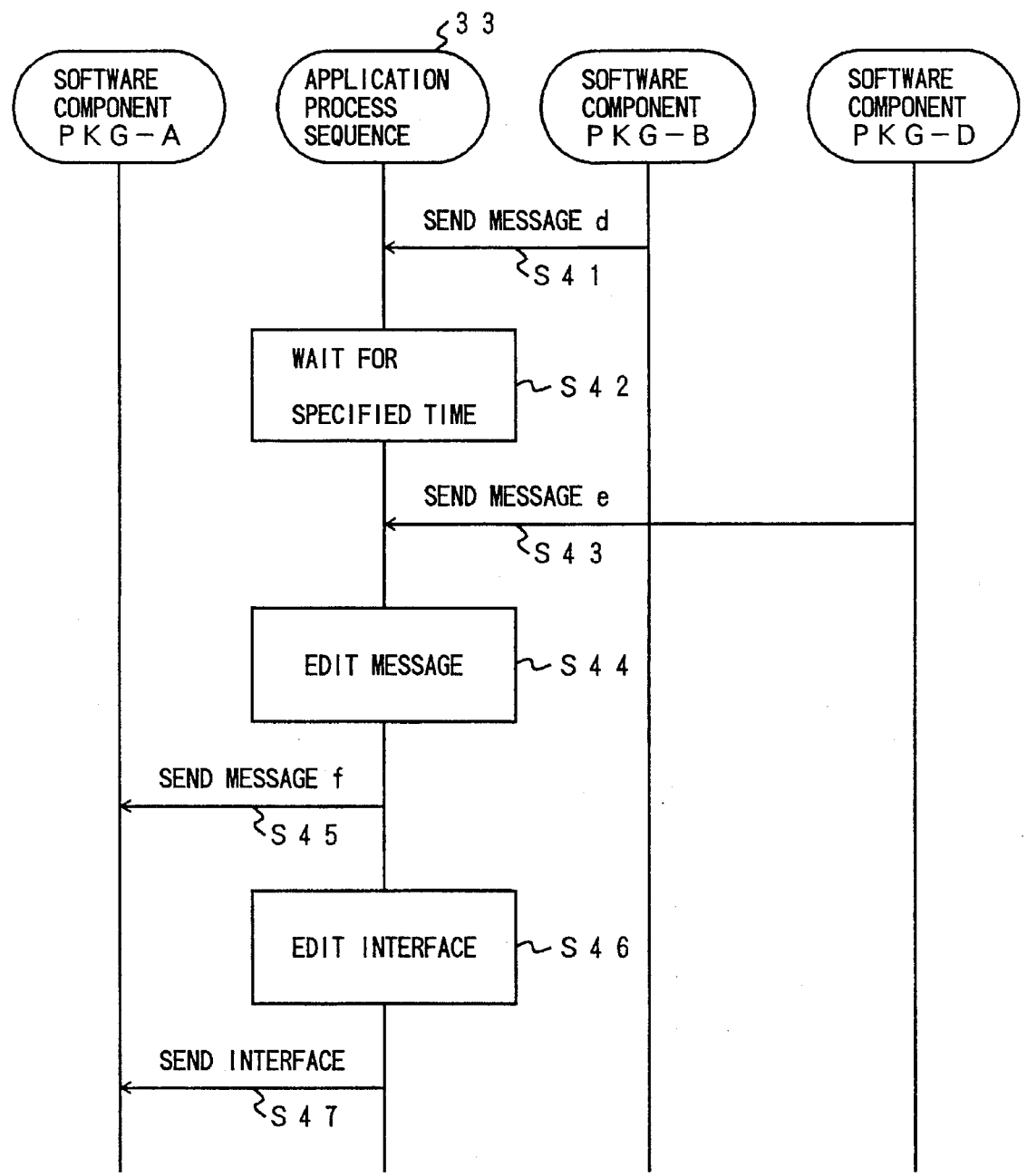
FIG. 19 is a sequence chart of the second example of the second embodiment.

FIG. 19 is a sequence chart showing the second example of the second embodiment explained in FIG. 18. The software component PKG-B sends a message d to the application process sequence 33 (S41). The application process sequence 33 put on hold the transmission process until a message arrives from the software component PKG-D (S42). When the software component PKG-D sends a message d to the application process sequence 33 (S43), the application process sequence 33 performs a editing such that the message d that arrived from the software component PKG-B and the message e that arrived from the software component PKG-D are merged (S44). The message f obtained as a result of the editing is sent to the software component PKG-A (S45). The application process sequence 33 edits the interface information received from the software components PKG-B and PKG-D (S46) and sends the resultant information to the software component PKG-A (S48).

[Operation of sending distributed message]

A description will now be given of a method (a variation to the second example of the second embodiment) obtained by reversing the pattern of the above described method.

Figure 20:
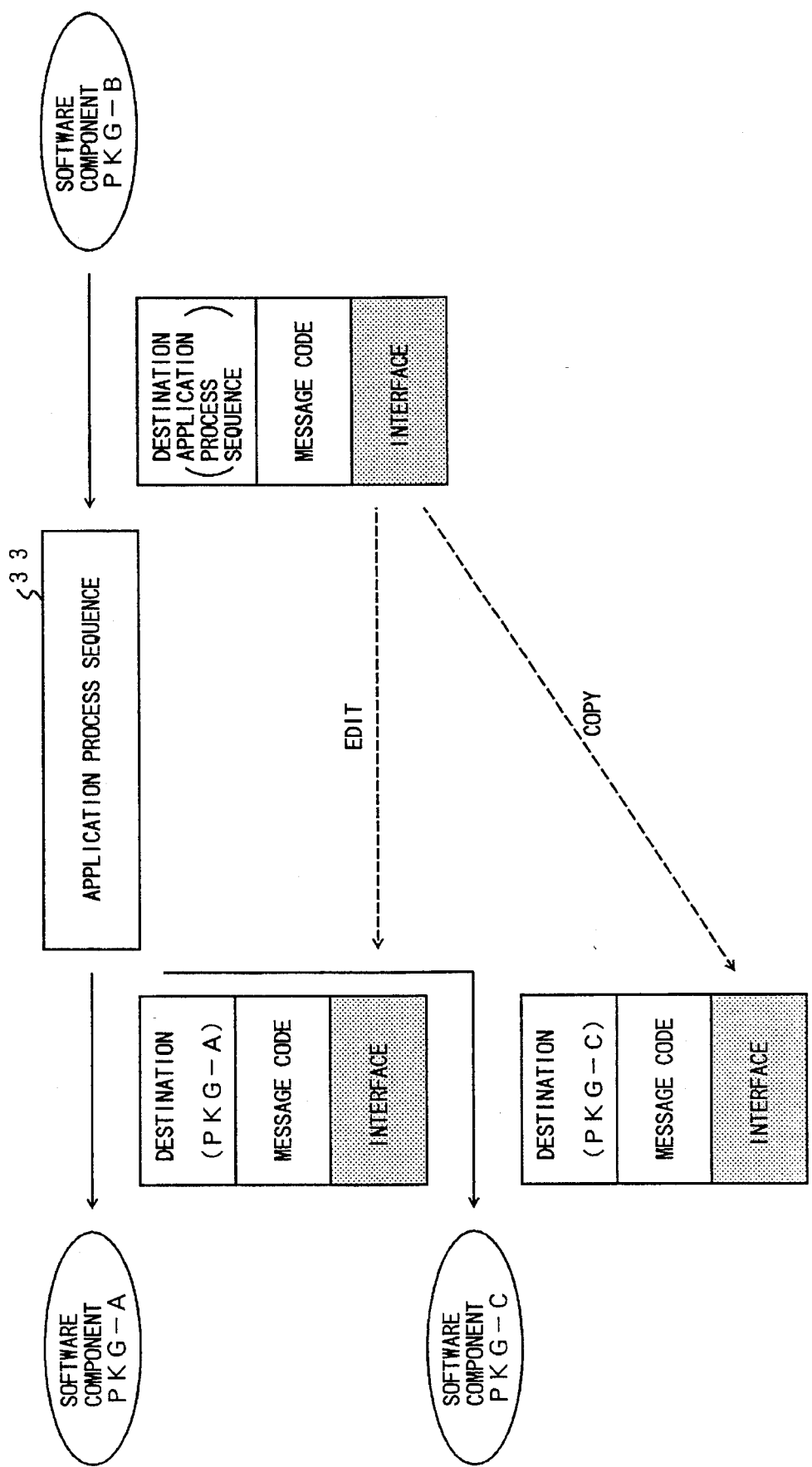
FIG. 20 explains a variation of the second example of the second embodiment.

FIG. 20 explains a variation of the second example of the second embodiment. In the example shown, one message sent by the software component PKG-B is copied and edited to produce two messages, and these two messages are sent to two software components PKG-A and PKG-C. The number of messages to be sent in response to a message and the destination of those sent messages may be defined in the definition body of the application process sequence.

Monitoring of time is also possible by defining a sequence of successive messages as one application in the definition body of the application process sequence. This one application starts when the application start message is received and ends when the application end message is received. When the application start message is received, and when the application end message is not received before the application monitoring time 3004 defined in the definition body 31 expires, a determination of time-out is made, and the abnormality message defined in the definition body 31 is sent.

Figure 21:
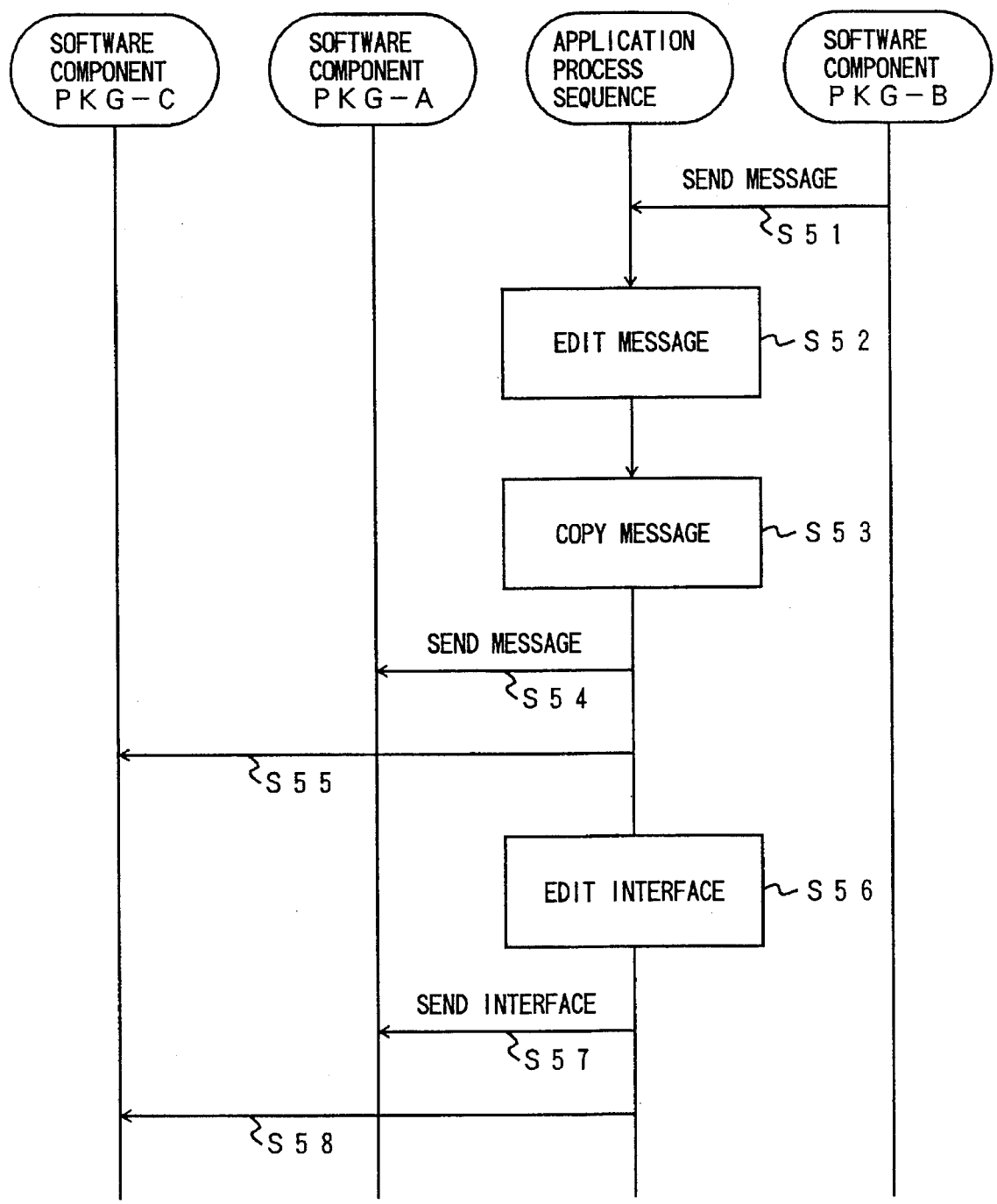
FIG. 21 is a sequence chart of the variation of the second example of the second embodiment.

FIG. 21 is a sequence chart of the variation of the second example of the second embodiment.

The software component PKG-B sends a message to the application process sequence 33 (S51). The application process sequence 33 edits the message that it received from the software component PKG-B (S52), copies the edited message (S53) and sends the messages to the software components PKG-A and the PKG-C (S54, S55). Thereafter, the application process sequence 33 edits the interface information (S56) and sends the interface to the software components PKG-A and PKG-C similarly to the case of the messages.

A description will now be given of the management of the operation mode of the redundancy system according to a third embodiment of the present invention. In this embodiment, switching of application software can be achieved without the application software of the software component being required to recognize the operation mode of the home system. Valid/invalid states, of the application software, corresponding to the operation mode is defined, and this information is utilized to turn the application software valid/invalid.

Figures 22A, 22B:
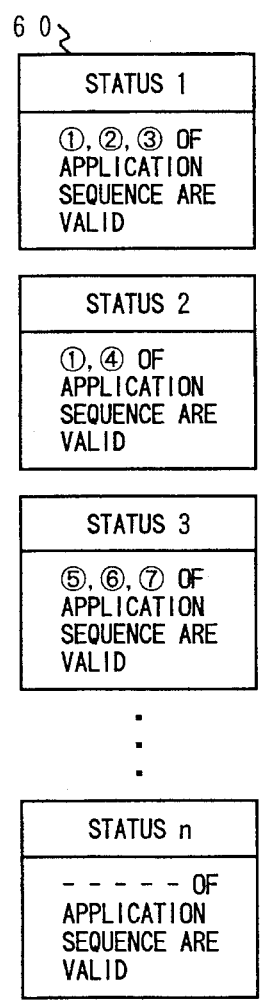
FIGS. 22A and 22B explain a third embodiment of the present invention.

FIGS. 22A and 22B are diagrams which explain the third embodiment. FIG. 22A shows status definition information indicating the operation mode. The status definition information is provided to correspond to each status. FIG. 22B shows an application sequence table that the application process sequence 33 has. For example, as shown in the figure, the status definition information corresponding to the status 1 may list the application numbers 1, 2 and 3 as being valid. In this case, the process a→the process b sequence of the valid application 1, the process b→the process c sequence of the valid application 2, and the process c→the process d sequence of the valid application 3 are carried out. That is, in the status 1, the processes a through d are carried out in succession in the main operation mode.

Figures 23A, 23B:
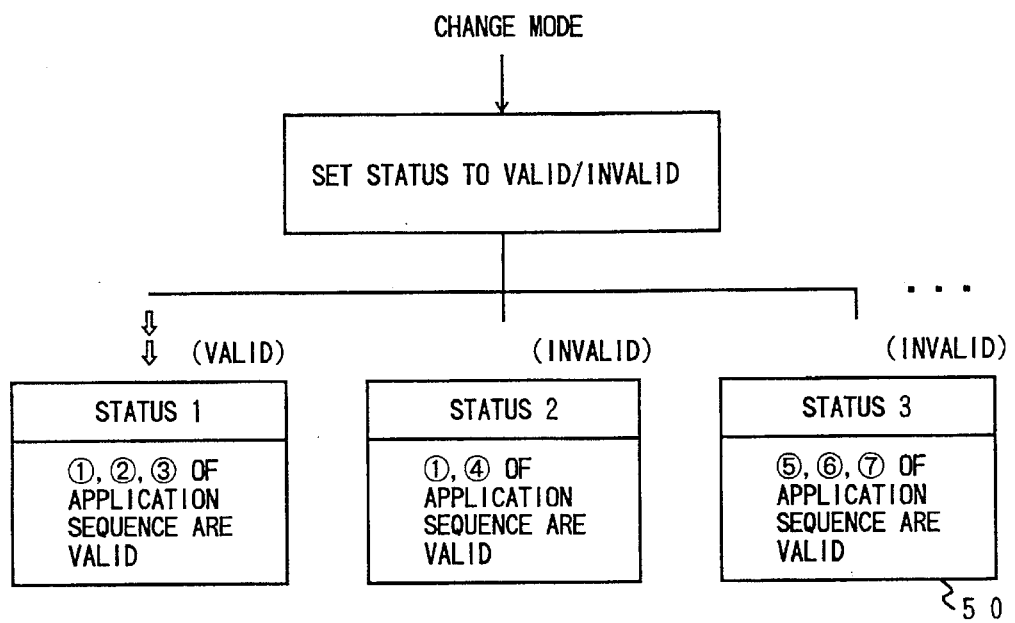
FIGS. 23A and 23B explain a mode switching operation according to the third embodiment.

FIGS. 23A and 23B are diagrams which explain the mode switching operation of the third embodiment. When a mode switching takes place such that the main system becomes the standby system, the status that had been executed in the main system is turned invalid, and another status becomes valid. It is assumed that a mode switching takes place when the status 3 had been valid, and the processes corresponding to the application numbers 5, 6 and 7 had been executed in the main system. In this case, the status 3 is turned invalid. Accordingly, the processes corresponding to the application numbers 5, 6 and 7 are not carried out. When a mode switching takes place such that the status 1 becomes valid, the processes corresponding to the application numbers 1, 2 and 3, listed in the status 1, become valid and are executed. In this case, the sequence of processes a→d corresponding to the status 1 is processed in the main system, and there is no need to check the operation mode within the process.

According to the software component combination system of the present invention, software components can be developed, modified and reutilized in an independent manner, without being affected by the software construction or the software to be combined to. Further, the modification of the construction of a decentralized/centralized system can be effected merely by modifying the combination information, there being no need to modify the application software within the software component. Accordingly, even when the combined software changes, there is no need to modify the software to adapt to new software to be combined to. Hence, it is easy to manage repeatedly used software. For example, supposing that there are a sales program at an A office, a sales program at a B office, and an accounting program, that the content of the sales program at the A office is to be modified, and that a modification in the accounting program is required in correspondence to that modification, modified elements of the sales program at the A office and modified elements of the accounting program are written in the combination information. The control by the combination control part ensures that it is not necessary to modify the sales program at the A office and the accounting program.

According to the message exchanging system of the present invention, definitions that are necessary for message exchanging are not held within a program but are defined in the definition body of the application process sequence. Since it is not necessary to modify a program in the face of any modification of message exchanging conditions, the degree of independence of the software components are improved.

According to the operation mode management system of the present invention, the valid/invalid states of the software component execution which states correspond to the operation mode are defined in the application sequence table. Therefore, it is not necessary for the software component to recognize the operation mode. Hence, it is possible to shift from a single-CPU system to a dual-CPU system or to add an operation mode, without modifying the software component.

The present invention is not limited to the above described embodiments, and variations and modifications may be made without departing from the scope of the present invention.

What is claimed is:

1. An execution control system which controls execution of software components and message exchanging between software components for software components issuing execution request information, comprising:

shared reference information containing procedure information to be referred to by said software components when any of said software components issues execution request information; and control means for referring to said shared reference information when execution request information is issued by any of said software components, for combining necessary ones of said software components in response to the issued execution request information, and for controlling execution of the combined necessary ones of said software components.

2. The execution control system as claimed in claim 1, wherein said control means receives execution request information, issued by one software component and specifying a destination software component, and said control means further comprises:

means, responsive to receipt of the execution request information issued by said one software component and specifying a destination software component, for:

referring to said shared reference information on the basis of said execution request information and obtaining a result from said shared reference information, and delivering, on the basis of the result obtained from the shared reference information, said execution request information to the destination software component specified by said execution request information.

3. The execution control system as claimed in claim 1, wherein said shared reference information is specified at the time of customization.

4. The execution control system as claimed in claim 1, wherein execution request information issued by software components specifies destination software components, and destination information of destination software components is appended, at the time of customization, to execution request information exchanged between software components, and the resultant information is delivered to said control means.

5. The execution control system as claimed in claim 1, wherein said control means further comprises:

means for specifying said shared reference information at the time of customization such that a plurality of software components are combined into one process, or such that the same software component is assigned in common to a plurality of processes.

6. The execution control system as claimed in claim 2, wherein said control means comprises:

means for receiving execution request information issued by a software component originating a request and specifying a destination software component;

means for referring to said shared reference information on the basis of said execution request information; and means for:

delivering said execution request information by a function, when the software component originating the request and the destination software component are in the same process;

delivering said execution request information via a message queue, when the software component originating the request and the destination software component are in different processes within the same apparatus, and delivering said execution request information via a socket when the software component originating the request and the destination software component are accommodated in different apparatuses.

7. The execution control system as claimed in claim 2, wherein said control means further comprises:

means for delivering a process result yielded by a destination software component that is executed on the basis of execution request information issued by a software component, the delivery being performed on the basis of the execution request information such that;

when the execution request information indicates that the process result is not necessary, the software component issuing the execution request information is not notified of the process result, when the software component issuing the execution request information and the destination software component are within the same process, delivery is performed via an argument when a function is returned, when the software component issuing the execution request information and the destination software component are in different processes within the same apparatus, delivery is performed via a message queue, and when the software component issuing the execution request information and the destination software component are accommodated in different apparatuses, delivery is performed via a socket.

8. The execution control system as claimed in claim 2, wherein said control means further comprises:

means for delivering a process result yielded by a destination software component that is executed on the basis of execution request information issued by a software component, the delivery being performed, such that;

when the software component issuing the execution request information requires non-synchronization, the software component issuing the execution request information proceeds without waiting for the process result from the destination software component, the process result being delivered separately, when the software component issuing the execution request information and the destination software component are accommodated in the same apparatus, delivery is performed via a message queue, and when the software component issuing the software request and the destination software component are accommodated in different apparatuses, delivery is performed via a socket.

9. The execution control system as claimed in claim 1, wherein software components exchange messages therebetween, a software component issuing a message being defined as a transmitting software component and a software component receiving the message being defined as a receiving software component, the execution control system controlling a plurality of applications, an application being defined as a stream of successive messages exchanged between software components, and said shared reference information includes information corresponding to the number of applications of the plurality of applications.

10. The execution control system as claimed in claim 9, wherein said control means further comprises:

means for referring to said shared reference information; and means for controlling message exchanging between a transmitting software component and a corresponding, receiving software component by compensating for differences in interfaces of the transmitting software component and of the corresponding, receiving software component.

11. The execution control system as claimed in claim 10, wherein said control means further comprises:

means for converting the format of the message sent from the transmitting software component so as to adapt to the reception format of the corresponding, receiving software component.

12. The execution control system as claimed in claim 10, wherein said control means further comprises:

means for editing the message sent from the transmitting software component by referring to the shared reference information, and for sending the edited message to the corresponding, receiving software component.

13. The execution control system as claimed in claim 11, wherein the message sent from the transmitting software component is sent to said control means for routing to said corresponding, receiving software component.

14. The execution control system as claimed in claim 11, wherein the message sent from the transmitting software component comprises a destination, a message code, a message and an interface.

15. The execution control system as claimed in claim 11, wherein said control means further comprises:

means for receiving a plurality of messages from the transmitting software component and for sending the plurality of messages to the receiving software component.

16. The execution control system as claimed in claim 11, wherein said control means further comprises:

means for receiving a message from a transmitting software component to be received by a plurality of receiving software components, the message including an interface;

means for editing the interface of said message;

means for reproducing said message to obtain a copy of the message for each of the plurality of receiving software components; and means for sending the copies to the receiving software components.

17. The execution control system as claimed in claim 11, wherein said control means further comprises:

means for regarding a stream of information from the transmitting software component as an application; and means for monitoring messages from the moment when an application start message is received to the moment when an application end message is received so that information other than that defined in said shared reference information is not accepted as a valid message.

18. The execution control system as claimed in claim 11, wherein said control means further comprises:

means for regarding a stream of messages from the transmitting software component as an application;

means for monitoring the messages until a monitoring time defined in said shared reference information expires such that, during the monitoring period, the received information is regarded as valid messages and information, other than that defined in said shared reference information, is not accepted.

19. The execution control system as claimed in claim 1, further comprising:

a main system;

a standby system, said shared reference information defining combinations of software components and applications as statuses having valid/invalid states;

means for managing the valid invalid states of the statuses; and said control means further comprising means for switching operation between the main system and the standby system by referring to said shared reference information.

20. The execution control system as claimed in claim 19, wherein said control means changes information relating to valid/invalid states of the status defined in said shared reference information when processing is switched from said main system to said standby system, or from said standby system to said main system.

21. An execution control system for controlling applications defined as a stream of successive messages exchanged between software components, a software component issuing a message being defined as a transmitting software component and a software component receiving the message being defined as the receiving software component, the execution control system comprising:

shared reference information containing information regarding the applications; and control means for referring to the shared reference information when exchanging messages between a transmitting software component and a corresponding, receiving software component.

22. The execution control system as claimed in claim 21, wherein the control means further comprises:

means for referring to the shared reference information, and means for controlling message exchanging between a transmitting software component and a corresponding, receiving software component by compensating for differences in interfaces of the transmitting software component and of the receiving software component.

23. The execution control system as claimed in claim 22, wherein the control means further comprises:

means for converting the format of a message sent from a transmitting software component so as to adapt to the reception format of the corresponding, receiving software component.

24. The execution control system as claimed in claim 22, wherein the control means further comprises:

means for editing a message sent from a transmitting software component by referring to the shared reference information, and for sending the edited message to the corresponding, receiving software component.

25. The execution control system as claimed in claim 23, wherein a message sent from a transmitting software component is sent to the control means for routing to the corresponding, receiving software component.

26. The execution control system as claimed in claim 23, wherein a message sent from a transmitting software component comprises a destination, a message code, a message and an interface.

27. The execution control system as claimed in claim 23, wherein the control means further comprises:

means for receiving a plurality of messages from the transmitting software component and for sending the plurality of messages to the corresponding, receiving software component.

28. The execution control system as claimed in claim 23, wherein the control means further comprises:

means for receiving a message from a transmitting software component to be received by a plurality of receiving software components, the message including an interface;

means for editing the interface of the message;

means for reproducing the message to obtain a copy of the message for each of the plurality of receiving software components; and means for sending the copies to the receiving software components.

29. The execution control system as claimed in claim 23, wherein the control means further comprises:

means for regarding a stream of information from a transmitting software component as an application; and means for monitoring messages from a moment when an application start message is received to a moment when an application end message is received and so that information, other than that defined in the shared reference information, is not accepted as a valid message.

30. The execution control system as claimed in claim 23, wherein the control means further comprises:

means for regarding a stream of messages from a transmitting software component as an application; and means for monitoring messages until a monitoring time defined in the shared reference information expires such that, during the monitoring period, the received information is regarded as valid messages, and information other than that defined in the shared reference information is not accepted.

31. An execution control system which controls the processing of software components and applications, an application being a stream of successive messages exchanged between software components, the execution control system comprising:

a main system;

a standby system;

shared reference information defining combinations of software components and applications as statuses having valid and invalid states;

means for managing the valid and invalid states of the statuses; and control means for switching operation between the main system and the standby system by referring to the shared reference information.

32. The execution control system as claimed in claim 31, wherein the control means changes information relating to valid and invalid states of the status defined in the shared reference information when processing is switched from the main system to the standby system or from the standby system to the main system.

* * * * *

UNITED STATES PATENT AND TRADEMARK OFFICE
CERTIFICATE OF CORRECTION

PATENT NO. : 5,608,894
DATED : Mar. 4, 1997
INVENTOR(S) : KAWAKAMI et al.

It is certified that error appears in the above-indentified patent and that said Letters Patent is hereby corrected as shown below:

Col. 1, line 32, change "component a" to --component $\underline{a}$--; and change "component b" to --component $\underline{b}$--;
line 33, change "component c" to --component $\underline{c}$--;
line 35, change "d." to --$\underline{d}$.--;
line 42, change "component a" to --component $\underline{a}$--;
line 44, change "component b" (both occurrences) to --component $\underline{b}$--;
line 46, change "a" to --$\underline{a}$--; and change "component c" to --component $\underline{c}$--;
line 47, change "component b" to --component $\underline{b}$--;
line 48, change "component c" to --component $\underline{c}$--;
line 50, change "component c" to --component $\underline{c}$--;
line 51, change "component d" to --component $\underline{d}$--;
line 53, change "component d" to --component $\underline{d}$--;
line 54, change "component c" to --component $\underline{c}$--;
line 59, change "a, b, c" to --$\underline{a}$, $\underline{b}$, $\underline{c}$--;
line 60, change "d" to --$\underline{d}$--.

Col. 2, line 13, change "message a" to --message $\underline{a}$--; and change "message b" to --message $\underline{b}$--;
line 18, change "message a" to --message $\underline{a}$--;
line 22, change "message a" to --message $\underline{a}$--;
line 24, change "message a" to --message $\underline{a}$--;
line 26, change "message b" to --message $\underline{b}$--;
line 28, change "message b" to --message $\underline{b}$--;
line 29, change "message b" to --message $\underline{b}$--.

Col. 7, line 15, delete "10" (second occurrence).

UNITED STATES PATENT AND TRADEMARK OFFICE
CERTIFICATE OF CORRECTION

PATENT NO. : 5,608,894
DATED : Mar. 4, 1997
INVENTOR(S) : KAWAKAMI et al.

It is certified that error appears in the above-indentified patent and that said Letters Patent is hereby corrected as shown below:

Col. 8, line 46, change "component a" to --component $\underline{a}$--; and change "component b" to --component $\underline{b}$--;
line 49, change "component b" to --component $\underline{b}$--;
line 52, change "component b" to --component $\underline{b}$--;
line 67, change "component c" to --component $\underline{c}$--.

Col. 9, line 3, change "V" to --$\underline{X}$--.
line 43, change "apparatus B" to --apparatus $\beta$--.

Col. 11, line 6, change "APPARATUS e" to --APPARATUS $\alpha$--,

Col. 12, line 15, change "a and b" (both occurrences) to --$\underline{a}$ and $\underline{b}$--;
line 27, change "a and b" to --$\underline{a}$ and $\underline{b}$--;
line 33, change "a and b" to --$\underline{a}$ and $\underline{b}$--.

Col. 15, line 24, change "message d" to --message $\underline{d}$--;
line 29, change "sage d" to --sage $\underline{e}$--;
line 31, change "message d" to --message $\underline{d}$--;
line 32, change "message e" to --message $\underline{e}$--;
line 33, change "message f" to --message $\underline{f}$--.

Col. 16, line 26, change "process a →" to --process $\underline{a}$ →--; and change "process b" to --process $\underline{b}$--;
line 27, change "process b →" to --process $\underline{b}$ →--; and change "process c" to --process $\underline{c}$--;
line 28, change "process c →" to --process $\underline{c}$ →--;

UNITED STATES PATENT AND TRADEMARK OFFICE
CERTIFICATE OF CORRECTION

PATENT NO. : 5,608,894
DATED : Mar. 4, 1997
INVENTOR(S) : KAWAKAMI et al.

It is certified that error appears in the above-indentified patent and that said Letters Patent is hereby corrected as shown below:

Col. 16, line 29, change "process d" to --process <u>d</u>--;
line 30, change "a through d" to --<u>a</u> through <u>d</u>--;
line 46, change "a → d" to --<u>a</u> → <u>d</u>--.

Col. 18, line 20 (Claim 6, line 12), change "process;" to --process,--;
line 25 (Claim 6, line 17), after "socket" insert --,--;
line 35 (Claim 7, line 7), after "information" insert --,--;
line 59 (Claim 8, line 6), change "that;" to --that:--.

Signed and Sealed this

Twenty-third Day of September, 1997

Attest:

BRUCE LEHMAN

Attesting Officer

Commissioner of Patents and Trademarks